United States Patent
Urano

(10) Patent No.: US 9,305,072 B2
(45) Date of Patent: Apr. 5, 2016

(54) INFORMATION STORAGE SYSTEM AND DATA REPLICATION METHOD THEREOF

(75) Inventor: Akihiro Urano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 14/110,868

(22) PCT Filed: Feb. 22, 2012

(86) PCT No.: PCT/JP2012/054280
§ 371 (c)(1),
(2), (4) Date: Oct. 9, 2013

(87) PCT Pub. No.: WO2012/140957
PCT Pub. Date: Oct. 18, 2012

(65) Prior Publication Data
US 2014/0032496 A1    Jan. 30, 2014

(30) Foreign Application Priority Data
Apr. 13, 2011   (JP) ................................ 2011-089420

(51) Int. Cl.
G06F 17/30 (2006.01)
G06F 11/16 (2006.01)
G06F 3/06 (2006.01)
G06F 11/20 (2006.01)

(52) U.S. Cl.
CPC ........ *G06F 17/30575* (2013.01); *G06F 3/0614* (2013.01); *G06F 11/2053* (2013.01); *G06F 17/30283* (2013.01); *G06F 17/30584* (2013.01)

(58) Field of Classification Search
CPC .................... G06F 17/30575; G06F 17/30283; G06F 17/30584; G06F 11/1662; G06F 3/0614
See application file for complete search history.

(56) References Cited

U.S. PATENT DOCUMENTS

| 7,925,624 B2 | 4/2011 | Vosshall et al. |
| 2008/0235321 A1 | 9/2008 | Matsuo |
| 2013/0031403 A1* | 1/2013 | Mordani et al. ............. 714/4.11 |

FOREIGN PATENT DOCUMENTS

| JP | 2008-234445 A | 10/2008 |
| JP | 2010-501942 A | 1/2010 |

OTHER PUBLICATIONS

Consistent hashing and random trees: distributed caching protocols for relieving hot spots on the World Wide Web, D. Karger, E. Lehman, T. Leighton, M. Levine, D. Lewin and R. Panigrahy, In: Proc. 29th Ann. ACM Symp. On Theory of Computing, 1997, pp. 654-663.

(Continued)

*Primary Examiner* — William Spieler
(74) *Attorney, Agent, or Firm* — Volpe and Koenig, P.C.

(57) ABSTRACT

An exemplary information storage system of the present invention includes a plurality of information storage nodes and an administration node. The administration node determines the defined number of information storage nodes for storing the data having the identical content to each of received data. The received data belong to the defined number of categories, respectively. In a case where use of a first information storage node in the plurality of information storage nodes is interrupted, each storage node replicates the data of an identical content to data stored in the first information storage node whose category is pre-associated with a category of the data stored in the first information storage node to an information storage node selected according to a predetermined sequence.

12 Claims, 18 Drawing Sheets

(56) References Cited

OTHER PUBLICATIONS

Dynamo: amazon's highly available key value store, G. DeCandia, D. Hastorun, M. Jampani, G. Kakulapati, A. Lakshman, A. Pilchin, S. Sivasubrmanian, P. Vesshall, W. Vogels : In: SOSP. pp. 205-220 (2007).

A Scalable Content-Addressable Network, Sylvia Ratnasamy, Paul Francis, Mark Handley, Richard Karp, Scott Shenker, SIGCOMM'01, Aug. 27-31, 2001, San Diego, California, USA.

Michio Irie et al., "A Load Balancing and Replica Partitioning Method for Consistent Hashing", IEICE Technical Report, Oct. 7, 2010, vol. 110, No. 224, pp. 69 to 74.

Michio Irie et al., "An ID Allocation Scheme for Consistent Hashing Considering Data Replication between Nodes", IEICE Technical Report, Nov. 12, 2009, vol. 109, No. 276, pp. 1 to 4.

Yoshiki Shimada, Twitter, Facebook ga Saiyo suru NoSQL System, Cassandra Jissen Nyumon, Web+DB Press, Sep. 25, 2010, vol. 58, pp. 47 to 58.

Avinash Lakshman et al., Cassandra—A Decentralized Structured Storage System, ACM SIGOPS Operating Systems Review, vol. 44, Issue 2, ACM, Apr. 2010, pp. 35-40.

Brad Anderson, Dynamo and CouchDB Clusters, [online], Aug. 13, 2010, [retrieval date May 21, 2012], Internet <URL:http://blog.cloudant.com/dynamo-and-couchdb-clusters/>.

* cited by examiner

FIG. 6

| | 248 | |
|---|---|---|
| | NODE MANAGEMENT TABLE | |
| 601 | 602 | 603 |
| NODE NAME | END VALUE OF RESPONSIBLE HASHING VALUE RANGE | LIFE-AND-DEATH INFORMATION |
| NODE 1 | 226 | ALIVE |
| NODE 2 | 535 | ALIVE |
| NODE 3 | 842 | ALIVE |
| NODE 4 | 1231 | ALIVE |
| NODE 5 | 2145 | ALIVE |
| NODE 6 | 2352 | ALIVE |
| NODE 7 | 3125 | ALIVE |
| NODE 8 | 4231 | ALIVE |
| NODE 9 | 4845 | DEAD |
| NODE 10 | 5252 | ALIVE |
| NODE 11 | 6625 | SUBSTITUTED |
| NODE 12 | 6752 | ALIVE |
| ⋮ | ⋮ | ⋮ |
| NODE 999 | 64523 | ALIVE |
| NODE 1000 | 65123 | ALIVE |

FIG. 7

DATA STORAGE TABLE 218

| KEY (701) | ORIGINAL NODE (702) | FIRST REPLICA STORAGE NODE (703) | SECOND REPLICA STORAGE NODE (704) | VALUE (705) | |
|---|---|---|---|---|---|
| TOKYO | NODE 2 | NODE 4 | NODE 7 | SUNNY | 706 |
| PARIS | NODE 2 | NODE 521 | NODE 543 | RAINY | 707 |
| LONDON | NODE 2 | NODE 36 | NODE 339 | CLOUDY | 708 |
| BERLIN | NODE 2 | NODE 965 | NODE 145 | SNOWY | 709 |
| WASHINGTON | NODE 62 | NODE 2 | NODE 4 | SUNNY | 710 |
| SAN JOSE | NODE 4 | NODE 2 | NODE 305 | SUNNY | 711 |
| SHANGHAI | NODE 475 | NODE 234 | NODE 2 | CLEAR | 712 |
| ⋮ | ⋮ | ⋮ | ⋮ | ⋮ | 713 |
| HIROSHIMA | NODE 754 | NODE 854 | NODE 2 | CLOUDY | 714 |
| NAGASAKI | NODE 352 | NODE 120 | NODE 2 | RAINY | 715 |

FIG. 8

| KEY | ORIGINAL NODE | FIRST REPLICA STORAGE NODE | SECOND REPLICA STORAGE NODE | VALUE | |
|---|---|---|---|---|---|
| | | DATA STORAGE TABLE — 218 | | | |
| 801 | 802 | 803 | 804 | 805 | |
| SAN JOSE | NODE 4 | NODE 2 | NODE 305 | SUNNY | 806 |
| TOKYO | NODE 2 | NODE 4 | NODE 7 | SUNNY | 807 |
| OTTAWA | NODE 475 | NODE 4 | NODE 256 | CLEAR | 808 |
| WASHINGTON | NODE 62 | NODE 2 | NODE 4 | SUNNY | 809 |
| ⋮ | ⋮ | ⋮ | ⋮ | ⋮ | 810 |

INFORMATION STORAGE SYSTEM AND DATA REPLICATION METHOD THEREOF

CLAIM OF PRIORITY

The present application claims priority from Japanese patent application JP2011-89420 filed on Apr. 13, 2011, the content of which is hereby incorporated by reference into this application.

BACKGROUND

The present invention relates to an information storage system and a data replication method thereof, and particularly, relates to data replication in an information storage system including a plurality of information storage nodes.

In a computing system, information required by a system is often stored in a database. A relational database is one of the most widely known databases. A relational database offers excellent functions such as data coupling and consistency of data in transactions. On the one hand, the relational database does not necessarily have high scalability.

With advancement of the distribution technology over Internet such as the cloud technology, a system is required that can increase the number of servers on demand, while enabling a multitude of servers to perform high-speed distributed processing. As a technology that can meet such a need, a key value store is attracting attention. A key value store stores a pair of a key and a value. A system specifies a key of a target value to acquire the value. By changing, depending on a key value, a destination server (node) in which a key is saved depending on a key value, the key value store can distribute data and save them in a plurality of servers. Thus, the key value store can easily construct a scale-out system which processes a large amount of data. The consistent hashing is known as a technique to determine a responsible node depending on a key value (See Non-Patent Literature 1, for example.)

In addition, Non-Patent Literature 2 discloses a technology to achieve high availability in a key value store. Specifically, the literature discloses replications of data by a plurality of hosts to achieve high availability and durability. Each data item is replicated and stored in N units of hosts which are set with respect to each instance. A coordinator node is assigned to each key. The coordinator node is responsible for replication of a data item which is assigned thereto. In addition to storing of each of the keys for which it is responsible in its own memory, the coordinator node replicates the keys to adjacent N−1 units of nodes in a clockwise direction in a ring arrangement.

Non-Patent Literature 2 discloses a method for adding a new node X and a method for removing a node from a system. By adding the new node X, a specific key range is assigned to X. Some existing nodes, which have retained keys newly assigned to the node X, no longer need to have those keys. The existing nodes transfer to the node X the keys which they no longer need to keep. Similarly, when a node is removed from a system, keys are relocated in reverse steps to the node addition.

In Non-Patent Literature 3, in order to improve data availability, one key is mapped to k points in a coordinate space by means of k different hash functions so as to replicate and store one key value pair in k different nodes in a system.

Non-Patent Literature 1: Consistent hashing and random trees: distributed caching protocols for relieving hot spots on the World Wide Web, D. Karger, E. Lehman, T. Leighton, M. Levine, D. Lewin and R. Panigrahy, In: Proc. 29th Ann. ACM Symp. On Theory of Computing, 1997, pp. 654-663

Non-Patent Literature 2: Dynamo: amazon's highly available key value store, G. DeCandia, D. Hastorun, M. Jampani, G. Kakulapati, A. Lakshman, A. Pilchin, S. Sivasubramanian, P. Vosshall, W. Vogels : In: SOSP. Pp. 205-220 (2007)

Non-Patent Literature 3: A Scalable Content-Addressable Network, Sylvia Ratnasamy, Paul Francis, Mark Handley, Richard Karp, Scott Shenker, SIGCOMM'01, Aug. 27-31, 2001, San Diego, Calif., USA

SUMMARY

In a distributed data store, it is important to keep the replication value of each data when a node is added or deleted. In a system including a plurality of nodes, when one of data is replicated and stored in some nodes in the system, the replication value means the number of nodes in which the one of data is stored.

For example, a system includes a multitude of nodes and data stored in 3 nodes in the system is in the condition that "the replication value is 3". One of the 3 nodes stores original data, while other 2 nodes store replicated data. When one of the 3 nodes fails and becomes unusable, the number of nodes which store the data decreases by 1, and thus the number of data replications is reduced to 2.

As noted above, Non-Patent Literature 1 describes a consistent hashing technique. However, since the consistent hashing of Non-Patent Literature 1 stores information only in 1 node, the information is lost if the node fails and becomes unusable.

In Non-Patent Literature 2, identical data are stored in N units of nodes. Specifically, identical data are stored in a certain coordinator node and in following N−1 units of nodes. This enables the data to be read from any of the nodes following the coordinator node even if the coordinator node becomes unusable.

However, all replicated data of original data stored in the coordinator node is stored in the nodes following it. Thus, when the replication value decreases due to a node failure, only nodes around a failed node contribute to processing of recovering the replication value, while nodes remote from the failed node cannot contribute to the process. Therefore the nodes in the neighborhood of the failed node must transmit and receive much data to recover the replication value.

Thus, in Non-Patent Literature 2, only a small number of nodes in the system contribute to the recovery process to recover the replication value, thus resulting in a disbalance in the amount of processing over the system. Accordingly, response time fluctuates depending on whether or not a node processing a request from a client is performing the recovery process, resulting in a fluctuation in the response time of a system. Furthermore, since the recovery process needs to be performed only by the small number of nodes, it takes much time before the replication value is recovered.

Now, a specific example will be shown. An example of a system will be described in which the number of nodes is 1000, each node is connected to a network of 1 Gbps (Giga Bit per Second), original data of 1 TB (Tera Byte) per node is retained (that is to say, data of 1 TB exists in a responsible range of each node), and the replication value is kept to 3.

Each of nodes has original data of 1 TB, a replica 1 of 1 TB, and a replica 2 of 1 TB. In fact, a total amount of data in each node is 3 TB. For illustrative purposes, a number from node 1 to node 1000 is assigned to each of the 1000 nodes in a clockwise direction. For example, a first replica of the original data retained in a node 1 (this shall be referred to as data in a node 1's responsible range) is retained in a node 2, and a second replica is retained in a node 3.

In other words, the node 3 retains a replica of the second original data of the node 1, a first replica of the original data of the node 2, and the original data of the node 3. In fact, the node 3 retains the data in the node 1's responsible range, data in a node 2's responsible range, and data in a node 3's responsible range. Similarly, a node 4 retains a second replica of the original data of the node 2, a first replica of the original data of the node 3, and the original data of the node 4. So do other nodes.

Now suppose that a node 5 becomes unusable due to a failure. A node 5's responsible range is newly added to a node 6's responsible range. In fact, the node 6 treats data which it retains as a first replica of the original data of the node 5, as the original data of the node 6. The node 6 further treats data which it retains as a second replica of the node 4, as a first replica of the node 4. Then, the node 6 newly replicates data in the node 3's responsible range from any node (node 3 or node 4), and retains the data as a second replica of the node 3.

Similarly, a node 7 needs to newly retain data in the node 4's responsible range, and a node 8 needs to newly retain data in the node 5's responsible range. Here, for example, data in the node 3's responsible range is replicated from the node 3 to the node 6, data in the node 4's responsible range is replicated from the node 4 to the node 7, and data in a range for which the node 5 is conventionally responsible (which is now data of a part of the node 6's responsible range) is replicated from the node 6 to the node 8. (The "processing of recovering the original replication value" shall be simply referred to as a "recovery process".)

Then, the node 3 must transmit 1 TB which corresponds to one-thirds of the data of 3 TB retained by it. Similarly, the node 4 and the node 6 must also transmit 1 TB which corresponds to one-thirds of the data retained by them. Furthermore, the node 6, node 7, and node 8 must respectively receive new data of 1 TB.

In particular, the node 6's responsible range is doubled. In addition, the node 6 must transmit data of 1 TB to the node 8 while receiving data of 1 TB from the node 3, thus often becoming highly-loaded. In addition, time for recovering the replication value to 3 is time for transferring data of 1 TB. Since the system uses the 1 Gbps network, the recovery process takes about 2 hours and 13 minutes. From the standpoint of data redundancy, it is very long time. It is desirable to recover the replication value more quickly.

In addition, a failure probability of an external storage device represented by a hard disk drive is higher as load increases. During the recovery process described above, although the node 3, the node 4, the node 6 and the node 7 retain precious data for which the replication value is "2", their accesses to the storage device increase. (Shortly, the load on the storage device increases.)

The high the load becomes, the more the failure probability increases. If any of the nodes mentioned above fails, data of 1 TB whose replication value is "1" is generated. Since the node retaining the data becomes further highly-loaded, the failure probability thereof further increases. Consequently, if the node fails, the data are permanently lost. Therefore, it is important to cut off the chain of the increasing failure probability.

As described above, Non-Patent Literature 3 discloses storage of identical data in k units of nodes (1 original data and k−1 replicas) by means of k different functions. The literature does not disclose addition and deletion of a node, however. If a certain node becomes unusable due to a failure, the replication value of data stored in that node decreases to k−1 in the entire system. Furthermore, if the k units of nodes fail, the data will be lost from the system.

The present invention has been made in light of such circumstances. One object thereof is to promptly recover the replication value when the replication value decreases due to a failure or deletion of a node, and the like.

To solve the problems, for, example, the configuration disclosed in the claims is employed. The present invention includes means to solve the problems and an example is an information storage system storing received data. The information storage system includes a network, a plurality of information storage nodes communicatably connected by the network, and an administration part communicatably connected with the plurality of information storage nodes. Each of the received data is replicated to a defined number of data having an identical content, and stored in one of the plurality of information storage nodes. The administration part is configured to provide the replicated data having the identical content with different categories. The administration part is configured to make a determination of information storage nodes for storing the data having the identical content and provided with the different categories from the plurality of information storage nodes. The administration part is configured to make the determination so that data which correspond to respective data belonging to one category and to be stored by one information storage node, have identical contents to the respective data and belong to a different category from the one category, are distributed in a plurality of information storage nodes other than the one information storage node. The administration part is configured to make the determination by substituting some or all of information contained in the received data into arithmetic expressions defined for respective categories. In a case where use of a first information storage node in the plurality of information storage nodes is interrupted, each of the plurality of information storage nodes is configured to extracts, from data stored in the each of the plurality of information storage nodes, one of data which has an identical content to data stored in the first information storage node and whose category is pre-associated with a category of the data stored in the first information storage node. Each of the plurality of information storage nodes is configured to replicate the extracted data to an information storage node selected according to a predetermined sequence.

According to an aspect of the present invention, in an information storage system including a plurality of information storage nodes, if the number of the information storage nodes which store data decreases, time necessary for data replication to increase the decreased replication value can be reduced. Any problem, configuration or effect other than those described above will become apparent through the following description of embodiments.

BRIEF DESCRIPTION OF DRAWINGS

FIG. 6 is a view showing an example of a node management table for managing the responsible hash value ranges and life-and-death information of respective information storage nodes in the first embodiment.

FIG. 7 is an example of a data storage table which stores data of a node 2 in the first embodiment.

FIG. 8 is an example of a data storage table which stores data of a node 4 in the first embodiment.

DETAILED DESCRIPTION OF THE EMBODIMENTS

Hereinafter, embodiments of the invention are described with reference to the accompanying drawings. For clear description, specific details of the following description and the drawings are omitted and simplified where appropriate. Further, throughout the drawings, the same elements are denoted by the same reference symbols, and redundant description is omitted where necessary for clear description.
<First Embodiment>

In the following, a first embodiment will be described. In the embodiment, a distributed data store (distributed information storage system) is described. In a distributed data store, original data is replicated, and the original data and one or more replicated data are stored in different information storage nodes. This allows high-speed processing and high failure resistance.

The present invention is preferable for a key value store which manages data with a pair of 2 data as a unit. Then, an example of a key value store is described in the embodiment. The present invention is also applicable to any distributed system other than the key value store. The key value store stores a pair of a key and a value. A user specifies a key of a target value to acquire the value (and the key).

Figure 1:
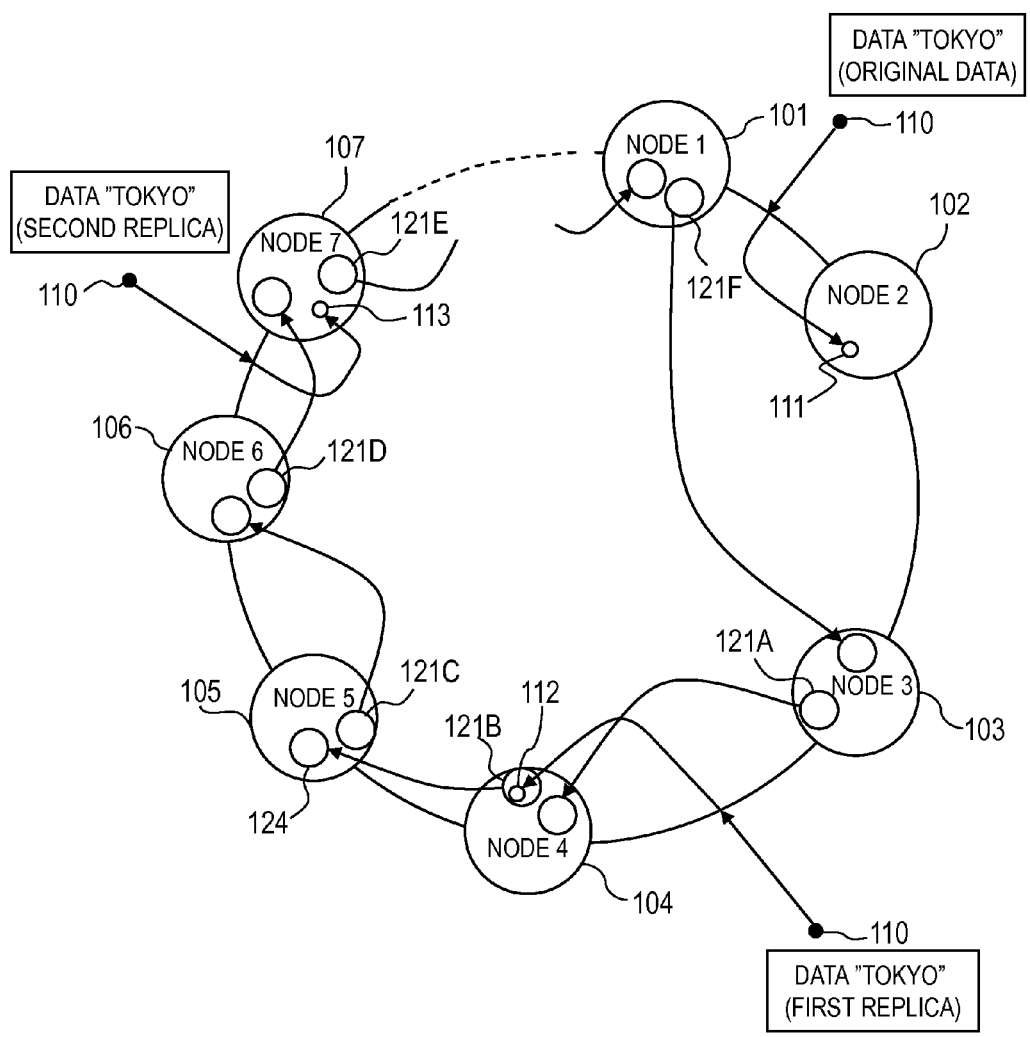
FIG. 1 is a view schematically showing a logical configuration of information storage nodes of a first embodiment.

Depending on a key value, a distributed key value store changes a destination server (node) in which original data and replicas thereof (replicated data of the original data) are saved. With reference to FIG. 1, a method with which a system of the embodiment determines nodes to store original data and replicas thereof will be described. FIG. 1 describes an example in which a storage destination of data "Tokyo" 110, which is a key, is determined. Selected servers respectively store a pair of the key and a value (an original pair or a replicate of the pair) (not shown). In the description of FIG. 1, a mention for the value is omitted.

FIG. 1 shows an example of a logical configuration of information storage nodes (hereinafter also referred to as nodes) included in the information storage system of the embodiment. The system is provided with a plurality of information storage nodes. FIG. 1 illustrates the ring-like arranged 7 information storage nodes from an information storage node 1 (101) to an information storage node 7 (107). The arrangement of the information storage nodes shows arrangement of nodes (logical positions) in a logical space for determining the information storage nodes which store data (original data and replicas), and does not mean a physical arrangement of the information storage nodes in the system.

FIG. 1 schematically shows a method for assigning user data (key) "Tokyo" 110 to the information storage nodes in the system. An original node for the data "Tokyo" 110 is a node 2 (102), which stores the original data 111.

A first replica storage node is a node 4 (104), which stores a first replica (data "Tokyo") 112. A second replica storage node is a node 7 (107), which stores a second replica (data "Tokyo") 113.

The information storage system uses 3 different arithmetic expressions to determine the information storage nodes for storing data of each of 3 categories (the original data, the first replica, and the second replica) of the user data. Using the arithmetic expressions enables acquisition of different computed values from the user data.

For example, the information storage system uses a hash function to determine the information storage nodes to which the original data and the 2 replicas are assigned. As a hash function, MD5, SHA-1, SHA-256, and the like are well known. For example, the information storage system of the embodiment prepares a different hash function for each of the original data, the first replica, and the second replica, and determines the information storage nodes for storing the original data and the replicas, respectively, according to a hash value of the key (the data "Tokyo" in this example) based on each hash function.

Alternatively, the information storage system calculates 3 different values from the key with a specified computing method (a combination of different values, for example), and substitutes the values into identical hash functions to obtain 3 different hash values.

Thus, types of hash functions needed to determine the information storage nodes for storing data can be reduced by calculating different values from a key associated with each of data categories (original data, a first replica, a second replica). Different hash functions may also be applied to some categories in a method for calculating different substituted values. In addition, the information storage nodes for storing data may be determined by using functions different from the hash functions.

On the circle (line showing logical positions of the information storage nodes) in FIG. 1, numbers from a minimum hash value to a maximum a hash value have been assigned in advance in the clockwise direction. A hash value means a value obtained by substituting a value into a hash function.

Each of the node 1 (101) to the node 7 (107) arranged on the circle has a responsible range of hash values.

For example, the node 2 (102) is responsible for a range of hash values from the node 1 (101) to the node 2 (102) on the circle. A responsible node for storing data is determined, for example, by reference to a table in which responsible ranges and responsible nodes are associated with hash values of data. A logical position of each information storage node may differ by category of data.

Even if original data is identical for any 2 data, the first replica storage nodes may not always be identical, and rather differs in many cases. Similarly, the second replica storage nodes often differ.

For example, the first replica storage node for the data "Tokyo" 110 is the node 4 (104), and the second replica storage node therefor is the node 7 (107). However, other data for which an original storage node is the node 2 (102) may be assigned to a node which is different from the information storage node 4 (104), as the first replica storage node, and to a node which is different from the information storage node 7 (107), as the second replica storage node. For example, for data "Paris", although an original node therefor is the node 2, the first replica storage nodes are the nodes 5, 2, 1, and the second storage nodes are the nodes 5, 4, 3.

Thus, a plurality of the first replicas of different original data of respective nodes are distributed to and stored in a plurality of other nodes. Similarly, a plurality of the second replicas of different original data are also distributed to and stored in a plurality of other nodes.

In the example of FIG. 1, a hash value of the data "Tokyo" 110 enters between the information storage node 1 (101) and the information storage node 2 (102). Therefore, the node 2 (102) is an original storage node (node storing the original data) of the data 110. The responsible hash value range of the node N (N is a natural number which is below a total number of nodes), which is other than the information storage node 1, is between a value obtained by adding 1 to an end value of the node N−1's responsible hash value range and an end value of the node N's responsible hash value range.

The information storage node 1's responsible range is a combination of both ranges from a minimum hash value to an end value of the information storage node 1's responsible hash value and from a value obtained by adding 1 to an end value of a last node's responsible hash value to a maximum hash value. In FIG. 1, data 121A to data 121F shown by circles respectively represent a set of data which each information storage node replicates to other information storage nodes (adjacent information storage nodes in FIG. 1), in response to removal of the node 2 (102) from the system due to a failure or any other reason. Data to be replicated 121A to 121F includes the original data, the first replica and the second replica.

According to specified regulations, respective information storage nodes replicate data related to the information storage node, use of which is interrupted, to other information storage nodes. The data to be replicated will be described below. In the example of FIG. 1, the first replica 112 in the node 4 (104) is included in the data 121B to be replicated, while the second replica 113 in the node 7 (107) is not included in the data 121E to be replicated.

In the example of FIG. 1, although all the information storage nodes as shown, excluding the node 2 (102), are illustrated to replicate the data to other information storage nodes, all information storage nodes in the system do not necessarily have data to be replicated.

Respective information storage nodes secure storage areas for temporarily replicating data accompanying removal of the information storage node. In FIG. 1, a storage area 124 secured in the node 5 (105) is given a symbol by way of example. Similarly, other information storage nodes secure storage areas for storing replicated data. A method for using the storage areas will be described below.

Thus, the information storage system stores a plurality of data which are identical to the user data. In the above example, it stores 3 identical data of the original data, the first replica, and the second replica. The replication value depends on a system design.

Thus, the 3 identical data to be stored are given categories (original, a first replica, and the like) which are different from each other, and belong to different groups, basically, an original data group, a first replica group, and a second replica group.

As described above, given a plurality of data of any category (original data, for example) to be stored in one information storage node, a plurality of identical data of other category (first replica, for example) corresponding thereto are not concentrated in one other information storage node, but arranged so that they are distributed to and stored in a plurality of information storage nodes. By using different arithmetic expressions in determination of the information storage nodes for data in each data category, identical data of different categories are distributed to and stored in a plurality of other information storage nodes. The arithmetic expressions mentioned above include a hash function.

Figure 2:
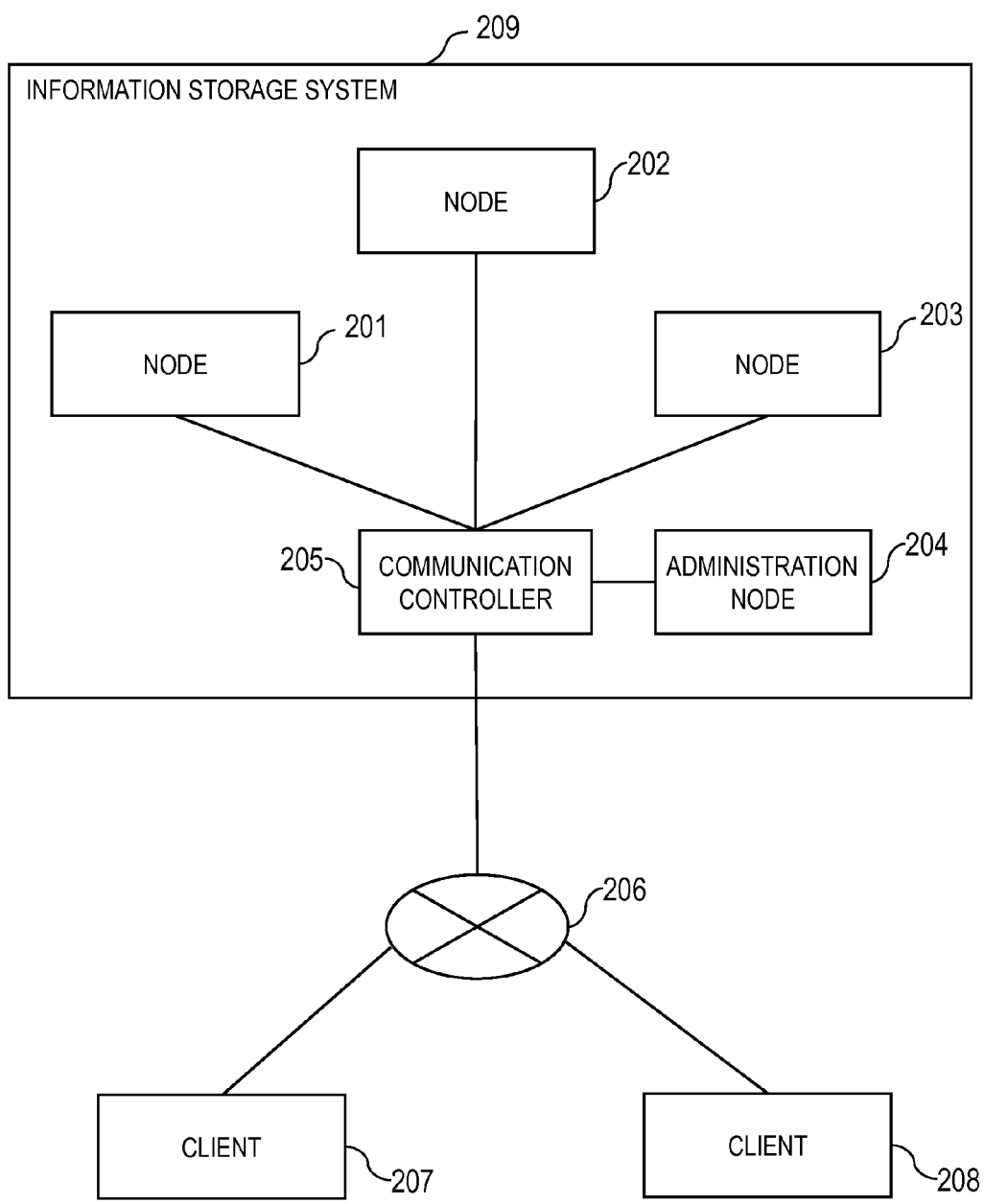
FIG. 2 is a block diagram showing a configuration example of an information storage system of the first embodiment and peripheral devices thereof.

Next, with reference to FIG. 2, an overview of a configuration of the information storage system of the embodiment will be given. FIG. 2 is a block diagram schematically showing a configuration example of the information storage system 209 and peripheral devices thereof in the embodiment. The information storage system 209 comprises information storage nodes (servers) 201, 201, 203, an administration node (administration server) 204, and a communication controller 205. While FIG. 2 shows 3 information storage nodes 201, 202, 203 by way of example, an actual system typically comprises more than 100 information storage nodes.

Each of the information storage nodes 201, 202, 203 is communicatably connected via the communication controller 205, and the administration node 204 is further communicatably connected with the information storage nodes 201, 202, 203 via the communication controller 205. The information storage system 209 is connected to an external network 206 by the communication controller 205. Clients 207, 208 are connected to the external network 206 and can communicate with the information storage nodes 201, 202, 203 and the administration node 204 via the communication controller 205.

In this system, a user operates the clients 207, 208 to write data into the information storage nodes 201, 202, 203 and then reads data from the information storage nodes 201, 202, 203.

When writing data, the clients 207, 208 transmit a "key" to the administration node 204 via the network 206 and the communication controller 205, requesting it to show 3 nodes to which data (a pair of a key and a value) is to be written. In response to the request involving the key from the clients 207, 208, the administration node 204 determines the nodes to store data from a value of the received key according to specified calculations, and returns identifiers of the determined nodes to the clients 207, 208.

The clients 207, 208 transmit the original data and the replica to the instructed nodes. Each node receives the data via the network 206 and the communication controller 205 and stores it.

Differently, the original node may allow the first and second replica nodes to store replicates (a first replica and a second replica) of the original data. In this configuration, in response to a request for a storage node from the clients 207, 208, the administration node 204 returns only an identifier of the original node to the clients 207, 208.

The clients 207, 208 transmit the key value pair to the specified original node together with an instruction for writing data and write (store) the key value pair to the original node. Upon receipt of the instruction for writing data and the data, the original node stores the received data in its storage device, and determines nodes respectively storing the first and the second replicas by either inquiring to the administration node 204 or with an approach similar to that of the administration node 204. The original node transmits the instruction for writing data and the data to the determined nodes via the communication controller 205. Upon receipt, the nodes respectively store the data in the storage devices.

When reading data, the clients 207, 208 communicate a "key" to the administration node 204, requesting it to show nodes from which the data should be read. In response to the request involving the key from the clients 207, 208, the administration node 204 identifies from the key the nodes which store the data according to the specified computation. The administration node 204 returns to the clients 207, 208, identifiers of the nodes from which the data is read. The clients 207, 208 transmit a read request together with the key to the nodes specified by the administration node 204 and receives the key value pair from the nodes.

Figure 3:
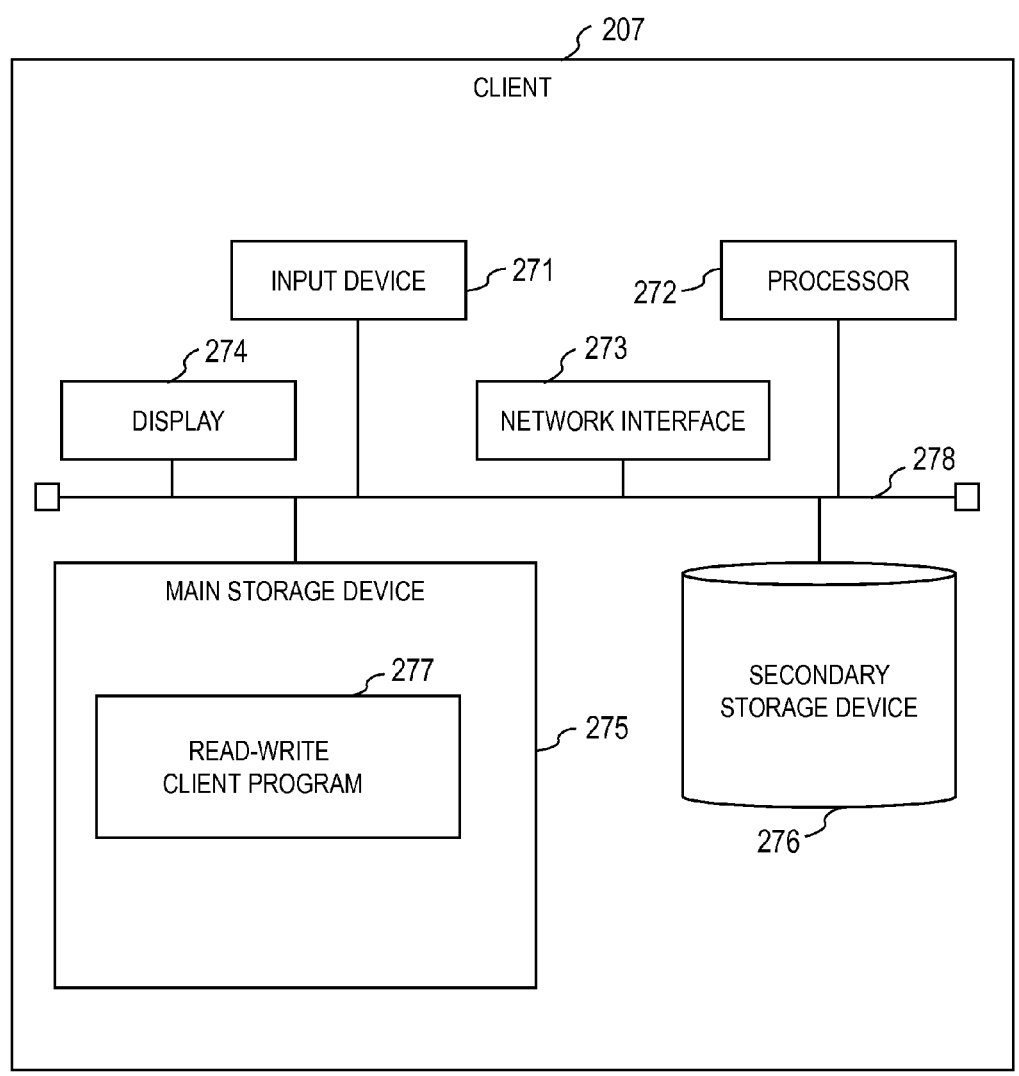
FIG. 3 is a block diagram schematically showing a configuration example of a client of the first embodiment.

As described above, using the clients 207, 208, the user performs writing and reading of data. FIG. 3 is a block diagram schematically showing a configuration of the client 207. The client 208 has a similar configuration to the client 207. The client 207 is a computing machine, including an input device 271, a processor 272, a network interface 273, a display 274, a main storage device 275, and secondary storage device 276. They are communicatably connected by a bus 278.

The client 207 is connected to the network 206 via the network interface 273 to communicate with other computing machines. The user inputs necessary information with the input device 271 (a mouse and a keyboard, for example) and can visually recognize necessary information with the display 274.

The processor 272 implements a predetermined function of the client 207 by executing a program stored in the main storage device 275. The main storage device 275 stores the program to be executed by the processor 272 and data necessary for execution of the program. The program includes a read-write client program 277, in addition to an OS (Operating System) not shown. The processor 272 can include a plurality of chips and a plurality of packages.

For convenience of the description, although the read-write client program 277 is shown in the main storage device 275, a program is typically loaded from a storage area of the secondary storage device 276 to a storage area of the main storage device 275. The storage devices 275, 276 can act as one storage device. The secondary storage device 276 is a storage device including a non-volatile persistent storage medium for storing a program and data needed to implement the predetermined function of the client 207. The secondary storage device 276 may be an external storage device connected via a network.

Using the read-write client program 277, the user communicates with the administration node 204 and the information storage nodes 201, 202, 203. In response to the read-write client program 277, input of the user with the input device 271, or input from other program, the user transmits information necessary for writing and reading of data to the administration node 204 and the information storage nodes 201, 202, 203 and receives information therefrom. The display 274 displays data received from the information storage nodes 201, 202, 203.

Figure 4:
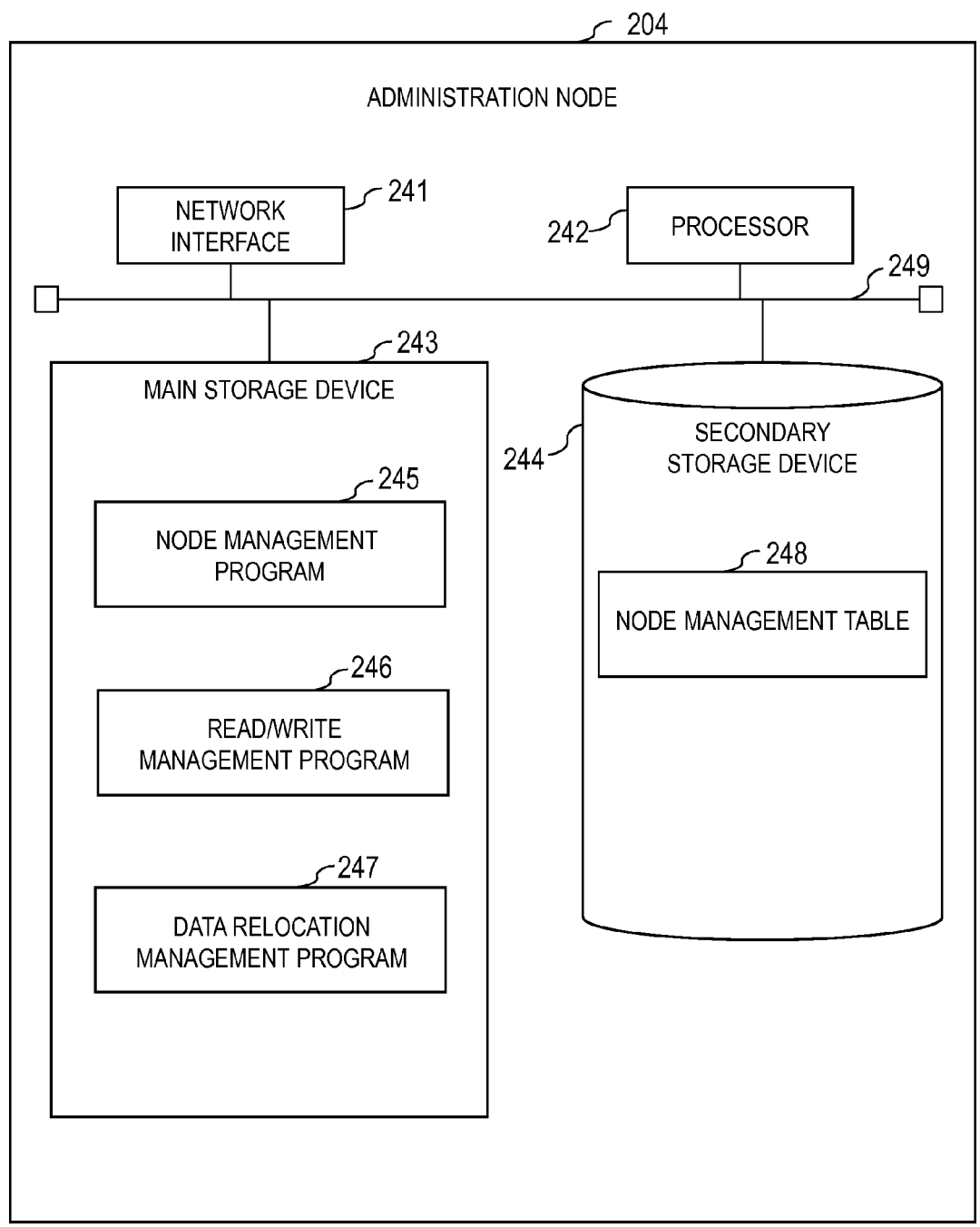
FIG. 4 is a block diagram schematically showing a configuration example of an administration node of the first embodiment.

Next, with reference to FIG. 4, a configuration of the administration node 204 will be described. FIG. 4 is a block diagram schematically showing a configuration of the administration node 204. The administration node 204 is a computing machine which manages the information storage nodes 201, 202, 203 and processing thereof. The administration node 204 may consist of a plurality of computing machines (computer systems). The administration node 204 manages accesses (writing of data and reading of data) to the information storage nodes 201, 202, 203, and manages processing involved in addition and deletion of a node operating in the system.

The administration node 204 includes a network interface 241, a processor 242, a main storage device 243, and a secondary storage device 244. They are communicatably connected by a bus 249. The processor 242 implements a predetermined function of the administration node 204 by executing a program stored in the main storage device 243. The processor 242 can include a plurality of chips and a plurality of packages.

The main storage device 243 stores a program to be executed by the processor 242 and data necessary for execution of the program. A program includes a node management program 245, a read-write management program 246, and a data relocation management program 247, in addition to the OS not shown.

The node management program 245 performs processing of managing information storage nodes, and manages responsible ranges of the information storage nodes included in the system, status thereof, and the like. The read-write management program 246 performs processing of managing writing of data to the information storage nodes and reading of data (access to the nodes). The data relocation management program 247 manages relocation of data among nodes, involved in addition/deletion of a node. The processing to be performed by these programs 245 to 247 will be described below in detail. For convenience of the description, in FIG. 4, the programs 245 to 247 are shown to be in the main storage device 243. Typically, a program is loaded from a storage area of the secondary storage device 244 to a storage area of the main storage device 243. The storage devices 243, 244 can act as one storage device.

The secondary storage device 244 is a storage device including a non-volatile persistent storage medium for storing a program and data needed to implement the predetermined function of the administration node 204, in addition to a node management table 248 as shown. The node management table 248 will be described below with reference to FIG. 6. Alternatively, the secondary storage device 244 may be an external storage device connected via a network. The administration node 204 may execute the read-write client program 277 to accept user operations via an input/output device.

Figure 5:
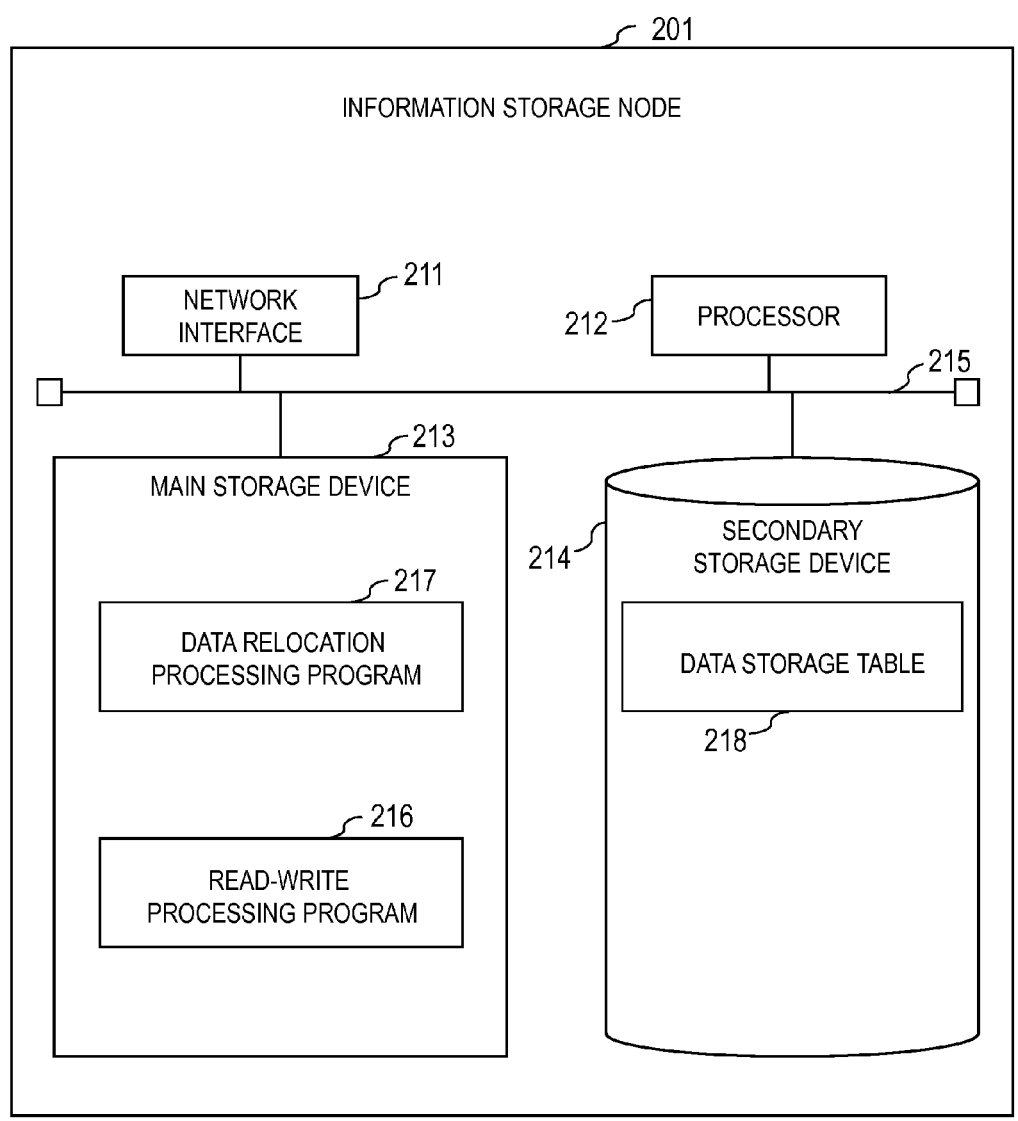
FIG. 5 is a block diagram schematically showing a configuration example of the information storage node of the first embodiment.

Next, with reference to FIG. 5, a configuration of the information storage node 201 will be described. Other information storage nodes 202, 203 also have an identical configuration to the information storage node 201, and a description thereof will be omitted. FIG. 5 is a block diagram schematically showing a configuration of the information storage node 201. The information storage node (server) 201 is a computing machine which stores a key value pair. The information storage node may include a plurality of computing machines.

The information storage node 201 includes a network interface 211, a processor 212, a main storage device 213, and a secondary storage device 214. They are communicatably connected by a bus 215. The processor 212 implements a predetermined function of the information storage node 201 by executing a program stored in a storage area of the main storage device 213.

The main storage device 213 stores a program to be executed by the processor 212 and data necessary for execution of the program. The program includes a read-write processing program 216 and a data relocation processing program 217, in addition to the OS not shown. The processor 212 can include a plurality of chips and a plurality of packages.

The read-write processing program 216 performs processing of writing and reading data as per a request from the clients 207, 208. The data relocation processing program 217 performs data relocation among nodes involved in deletion/addition of a node in the system. The processing to be performed by these programs 216, 217 will be described below in detail.

For convenience of the description, in FIG. 5, the programs 216, 217 are shown to be in the main storage device 213. Typically, a program is loaded from a storage area of the secondary storage device 214 to a storage area of the main storage device 213. The storage devices 213, 214 can act as one storage device.

The secondary storage device 214 is a storage device including a non-volatile persistent storage medium for storing a program and data needed to implement the predetermined function of the information storage node 201, in addition to a data storage table 218 as shown. The data storage table 218 will be described below with reference to FIG. 7. The secondary storage device 214 may be an external storage device connected via a network.

As described above, the programs are executed by the processor so as to perform defined processes by means of the memories and a communication port (communication device). Therefore, a description in this and other embodiments in which a subject is a program may be a description in which a subject is a processor. Alternatively, processing executed by a program is processing to be performed by a computing machine in which the program operates. By operating in accordance with the program, the processor operates as a function unit to implement the predetermined function.

At least a part of a program may be implemented by dedicated hardware. A program can be installed in each computing machine by a program distributing server or a persistent storage medium which can be read by the computing machine. It can be stored in a non-volatile memory of each computing machine.

FIG. 6 is a view showing an example of the node management table 248 stored in the administration node 204. The node management table 248 is a table for the node management program 245 (administration node 204) to manage each information storage node, specifically, a responsible hash value range and life-and-death status of each information storage node. Each row (record) stores information on one node, and the node management table 248 of the example manages 1000 nodes. Shortly, the information storage system 209 includes 1000 nodes.

A column 601 for "Node Name" stores node names of respective nodes. Specifically, a row (entry) 604 is a description of a node whose "node name" is a "node 1". A row 605 is a description of a node whose "node name" is a "node 2". A row 606 is a description of a node whose "node name" is a "node 3". A row 607 is a description of a node whose "node name" is a "node 4". A row 608 is a description of a node whose "node name" is a "node 5".

A row 609 is a description of a node whose "node name" is a "node 6". A row 610 is a description of a node whose "node name" is a "node 7". A row 611 is a description of a node whose "node name" is a "node 8". A row 612 is a description of a node whose "node name" is a "node 9". A row 613 is a description of a node whose "node name" is a "node 10".

A row 614 is a description of a node whose "node name" is a "node 11". A row 615 is a description of a node whose "node name" is a "node 12". A row 616 indicates the mid-entries are omitted in FIG. 6. A row 617 is a description of a node whose "node name" is a "node 999". A row 618 is a description of a node whose "node name" is a "node 1000".

A column 602 for "End Value in Responsible Hash Value Range" stores a last value of a responsible hash value range of each node. Specifically, an "end value in a responsible hash value range" of the "node 1" is "226". An "end value in a responsible hash value range" of the "node 2" is "535". The fact that the "end value in the responsible hash value range" of the "node 1" being "226" means that the "end value in the responsible hash value range" of the "node 2 is 227 (which is the value following the end value "226" of the node 1) to 535.

Similarly, an "end value in a responsible hash value range" of the node whose "node name" is "node 3" is "842". It means that the responsible hash value range of "node 3" is 536 to 842. Similarly, an "end value in a responsible hash value range" of the node whose "node name" is "node 4" is "1231". An "end value in a responsible hash value range" of the node "the node name whose "node name" is "node 5" is "2145". An "end value in a responsible hash value range" of the node whose "node name" is "node 6" is "2352".

An "end value in a responsible hash value range" of the node whose "node name" is "node 7" is "3125". An "end value in a responsible hash value range" of the node whose "node name" is "node 8" is "4231". An "end value in a responsible hash value range" of the node whose "node name" is "node 9" is "4845". An "end value in a responsible hash value range" of the node whose "node name" is "node 10" is "5252".

An "end value in a responsible hash value range" of the node whose "node name" is "node 11" is "6625". An "end value in a responsible hash value range" of the node whose "node name" is "node 12" is "6752". An "end value in a responsible hash value range" of the node whose "node name" is "node 999" is "64523". An "end value in a responsible hash value range" of the node whose "node name" is "node 1000" is "65123".

A column 603 for "life-and-death information" stores information indicating a life-and-death state of each node. Specifically, it indicates whether each node is alive (ALIVE state), dead (DEAD state) or substituted (SUBSTITUTED state). The ALIVE state indicates that the information storage node operates normally. The DEAD state indicates that the information storage node does not operate normally due to a failure or any other reason, does not accept any access, and its responsible data is not relocated in other information storage node (before being relocated).

A storage node in the SUBSTITUTED state means that after it is once in the DEAD state, its responsible data is now relocated in other information storage node in the ALIVE state. If an information storage node in the ALIVE state enters the DEAD state due to a failure or any other reason.

Then, if its responsible data is relocated in other information storage node, it changes to the SUBSTITUTED state. These states and state changes will be described below in detail.

In the node management table 248 of the example, the "life-and-death information" for the node whose "node name" is the "node 1" is "ALIVE". The "life-and-death information" for the node whose "node name" is the "node 2" is "ALIVE". The "life-and-death information" for the node whose "node name" is the "node 3" is "ALIVE". The "life-and-death information" for the node whose "node name" is the "node 4" is "ALIVE".

The "life-and-death information" for the node whose "node name" is the "node 5" is "ALIVE". The "life-and-death information" for the node whose "node name" is the "node 6" is "ALIVE". The "life-and-death information" for the node whose "node name" is the "node 7" is "ALIVE". The "life-and-death information" for the node whose "node name" is the "node 8" is "ALIVE". The "life-and-death information" for the node whose "node name" is the "node 9" is "DEAD".

The "life-and-death information" for the node whose "node name" is the "node 10" is "ALIVE". The "life-and-death information" for the node whose "node name" is the "node 11" is "SUBSTITUTED". The "life-and-death information" for the node whose "node name" is the "node 12" is "ALIVE". The "life-and-death information" for the node whose "node name" is the "node 999" is "ALIVE". The "life-and-death information" for the node whose "node name" is the "node 1000" is "ALIVE".

FIG. 7 is a view showing an example of the data storage table 218 that the information storage nodes have. The data storage table 218 not only stores a value of each key value pair stored by an information storage node, but also associates the storage node storing the key value pair, with the key value pair, and stores it.

FIG. 7 illustrates the data storage table 218 retained by the information storage node 2 (102) in FIG. 1. A column 701 for "Key" is a column indicating a key of a corresponding item. A row (entry) 706 is a description of a pair for which the "key" is "Tokyo". A row 707 is a description of a pair for which the "key" is "Paris". A row 708 is a description of a pair for which the "key" is "London".

A row 709 is a description of a pair for which the "key" is "Berlin". A row 710 is a description of a pair for which the "key" is "Washington". A row 711 is a description of a pair for which the "key" is "San Jose". A row 712 is a description of a pair for which the "key" is "Shanghai". A row 713 indicates that in-between entries are omitted. A row 714 is a description of a pair for which the "key" is "Hiroshima". A row 715 is a description of a pair for which the "key" is "Nagasaki".

A column 702 for "Original Node" describes the names of nodes storing original data. For example, the "original node" of the pair for which the "key" is "Tokyo" is the "node 2". The "original node" of the pair for which the "key" is "Paris" is the "node 2". The "original node" of the pair for which the "key" is "London" is the "node 2". The "original node" of the pair for which the "key" is "Berlin" is the "node 2".

The "original node" of the pair for which the "key" is "Washington" is the "node 62". The "original node" of the pair for which the "key" is "San Jose" is the "node 4". The "original node" of the pair for which the "key" is "Shanghai" is the "node 475". The "original node" of the pair for which the "key" is "Hiroshima" is the "node 754". The "original node" of the pair for which the "key" is "Nagasaki" is the "node 352".

A column 703 for "First Replica Storage Node" describes the names of nodes storing the first replicas. For example, the "first replica storage node" of the pair for which the "key" is "Tokyo" is the "node 4". The "first replica storage node" of the pair for which the "key" is "Paris" is the "node 521". The "first replica storage node" of the pair for which the "key" is "London" is the "node 36".

The "first replica storage node" of the pair for which the "key" is "Berlin" is the "node 965". The "first replica storage node" of the pair for which the "key" is "Washington" is the "node 2". The "first replica storage node" of the pair for which the "key" is "San Jose" is the "node 2". The "first replica storage node" of the pair for which the "key" is "Shanghai" is the "node 234". The "first replica storage node" of the pair for which the "key" is "Hiroshima" is the "node 854". The "first replica storage node" of the pair for which the "key" is "Nagasaki" is the "node 120".

A column 704 for "Second Replica Storage Node" describes the names of nodes storing the second replicas. For example, the "second replica storage node" of the pair for which the "key" is "Tokyo" is the "node 7". The "second replica storage node" of the pair for which the "key" is "Paris" is the "node 543". The "second replica storage node" of the pair for which the "key" is "London" is the "node 339".

The "second replica storage node" of the pair for which the "key" is "Berlin" is the "node 145". The "second replica storage node" of the pair for which the "key" is "Washington" is the "node 4". The "second replica storage node" of the pair for which the "key" is "San Jose" is the "node 305".

The "second replica storage node" of the pair for which the "key" is "Shanghai" is the "node 2". The "second replica storage node" of the pair for which the "key" is "Hiroshima" is the "node 2". The "second replica storage node" of the pair for which the "key" is "Nagasaki" is the "node 2".

A column 705 for "Value" stores the values for the keys. For example, the "value" of the pair for which the "key" is "Tokyo" is "sunny". The "value" of the pair for which the "key" is "Paris" is "rainy". The "value" of the pair for which the "key" is "London" is "cloudy". The "value" of the pair for which the "key" is "Berlin" is "snowy".

The "value" of the pair for which the "key" is "Washington" is "sunny". The "value" of the pair for which the "key" is "San Jose" is "sunny". The "value" of the pair for which the "key" is "Shanghai" is "clear". The "value" of the pair for which the "key" is "Hiroshima" is "cloudy". The "value" of the pair for which the "key" is "Nagasaki" is "rainy".

FIG. 8 illustrates the data storage table 218 retained by the information storage node 4 (104) in FIG. 1. A column 801 for "Key" stores keys of entries. A row (entry) 806 is a description of the pair for which the "key" is "San Jose". A row 807 is a description of the pair for which the "key" is "Tokyo". A row 808 is a description of a pair for which the "key" is "Ottawa". A row 809 is a description of the pair for which the "key" is "Washington". A row 810 indicates the following entries are omitted in FIG. 8.

A column 802 for "Original Node" describes the names of nodes storing original data. For example, the "original node" of the pair for which the "key" is "San Jose" is the "node 4". The "original node" of the pair for which the "key" is "Tokyo" is the "node 2". The "original node" of the pair for which the "key" is "London" is the "node 2". The "original node" of the pair for which the "key" is "Ottawa" is the "node 475". The "original node" of the pair for which the "key" is "Washington" is the "node 62".

A column 803 for "First Replica Storage Node" describes the names of nodes storing the first replicas. For example, the "first replica storage node" of the pair for which the "key" is "San Jose" is the "node 2". The "first replica storage node" of the pair for which the "key" is "Tokyo" is the "node 4". The "first replica storage node" of the pair for which the "key" is "Ottawa" is the "node 4". The "first replica storage node" of the pair for which the "key" is "Washington" is the "node 2".

A column 804 for "Second Replica Storage Node" describes the names of nodes storing the second replicas. For example, the "second replica storage node" of the pair for which the "key" is "San Jose" is the "node 305". The "second replica storage node" of the pair for which the "key" is "Tokyo" is the "node 7". The "second replica storage node" of the pair for which the "key" is "Ottawa" is the "node 256". The "second replica storage node" of the pair for which the "key" is "Washington" is the "node 4".

A column 805 for "Value" stores the values for the keys. For example, the "value" of the pair for which the "key" is "San Jose" is "sunny". The "value" of the pair for which the "key" is "Tokyo" is "sunny". The "value" of the pair for which the "key" is "Ottawa" is "clear". The "value" of the pair for which the "key" is "Washington" is "sunny".

As described above, the administration node 204 performs processing by using the node management table 248, and the information storage nodes 201, 202, 203 performs processing by using the data storage table 218. In this and other embodiments, information (information for node management or information and the like related to data being stored) to be used by the information storage system may be represented in any data structure, without depending on a data structure. For example, a data structure which is appropriately selected from a table, a list, a database, or a queue can store information. The information to be used by the information storage system is stored in a corresponding data storage area in a data memory.

Figure 9:
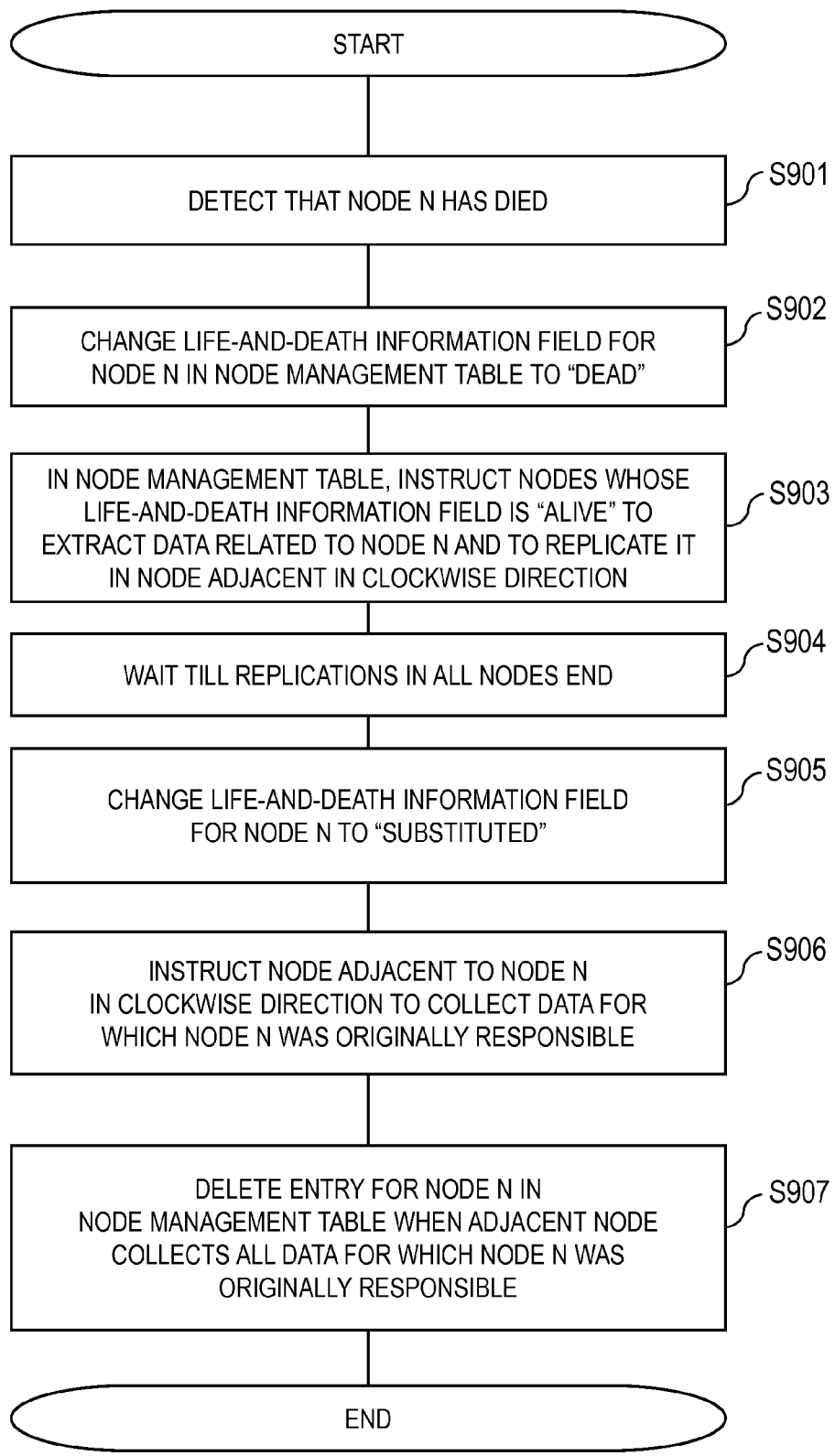
FIG. 9 is a flow chart showing a processing when a node N dies in the first embodiment.
Figure 10:
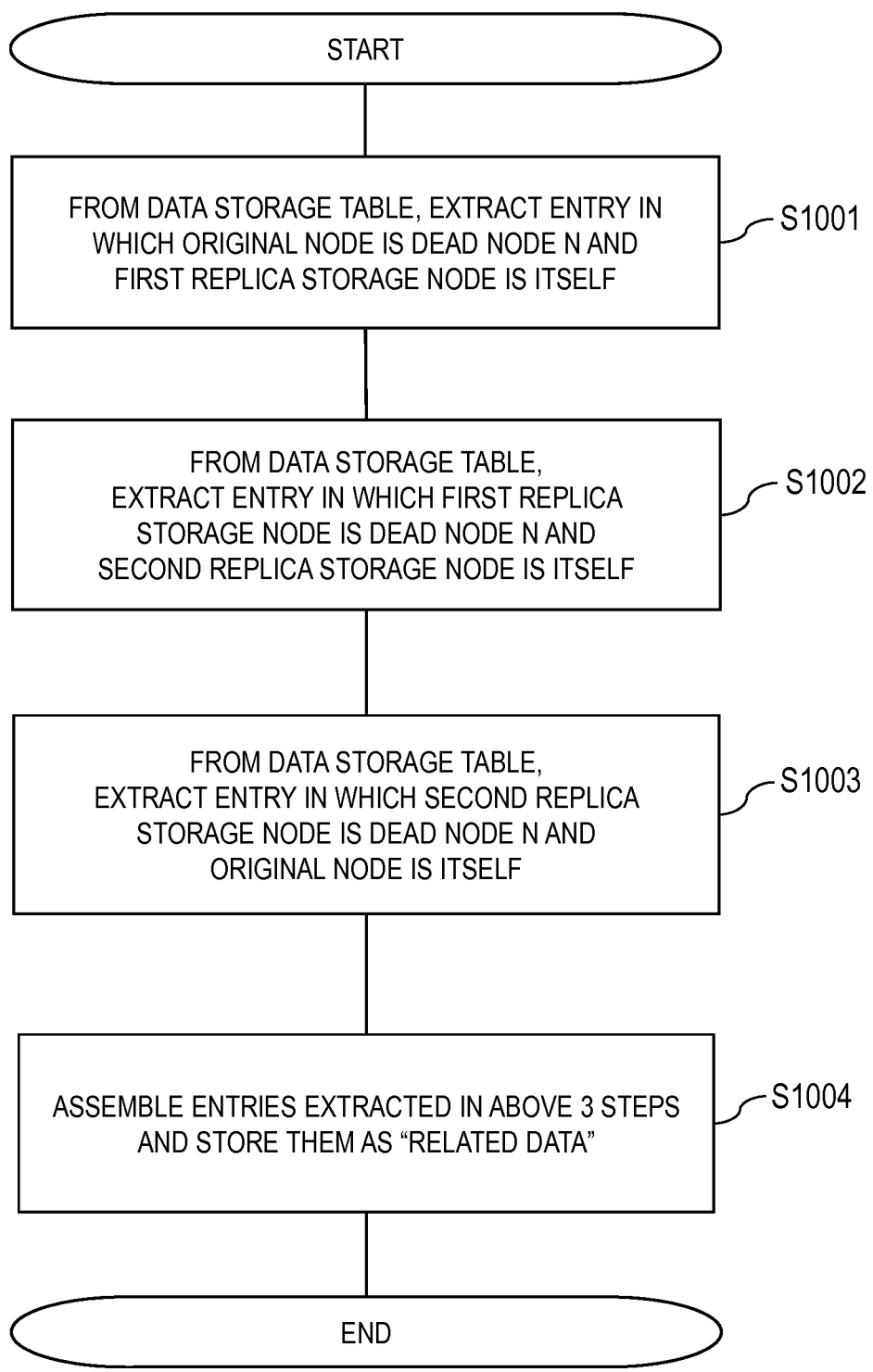
FIG. 10 is a flow chart of extracting data related to the node N, from the data owned by the information storage nodes themselves, in the first embodiment.

In the following, processing to be performed by the information storage system 209 will be described with reference to the flow charts in FIG. 9 to FIG. 17. FIG. 9 and FIG. 10 show examples of processing when a node N which was normally operating has died due to a failure or any other reason.

Figure 11:
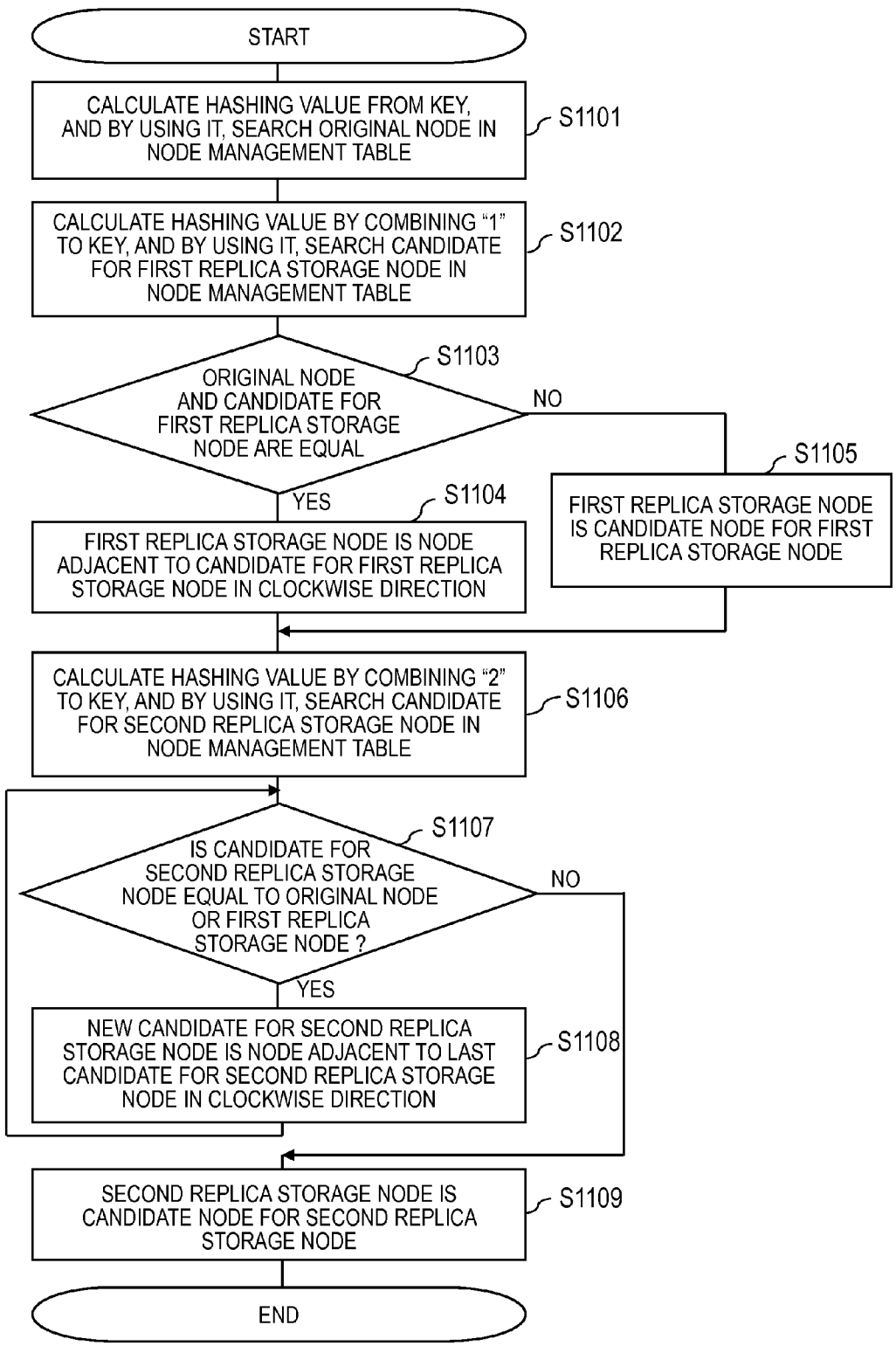
FIG. 11 is a flow chart of determining an information storage node which the date is stored in or written into, from a key value in the first embodiment.
Figure 12:
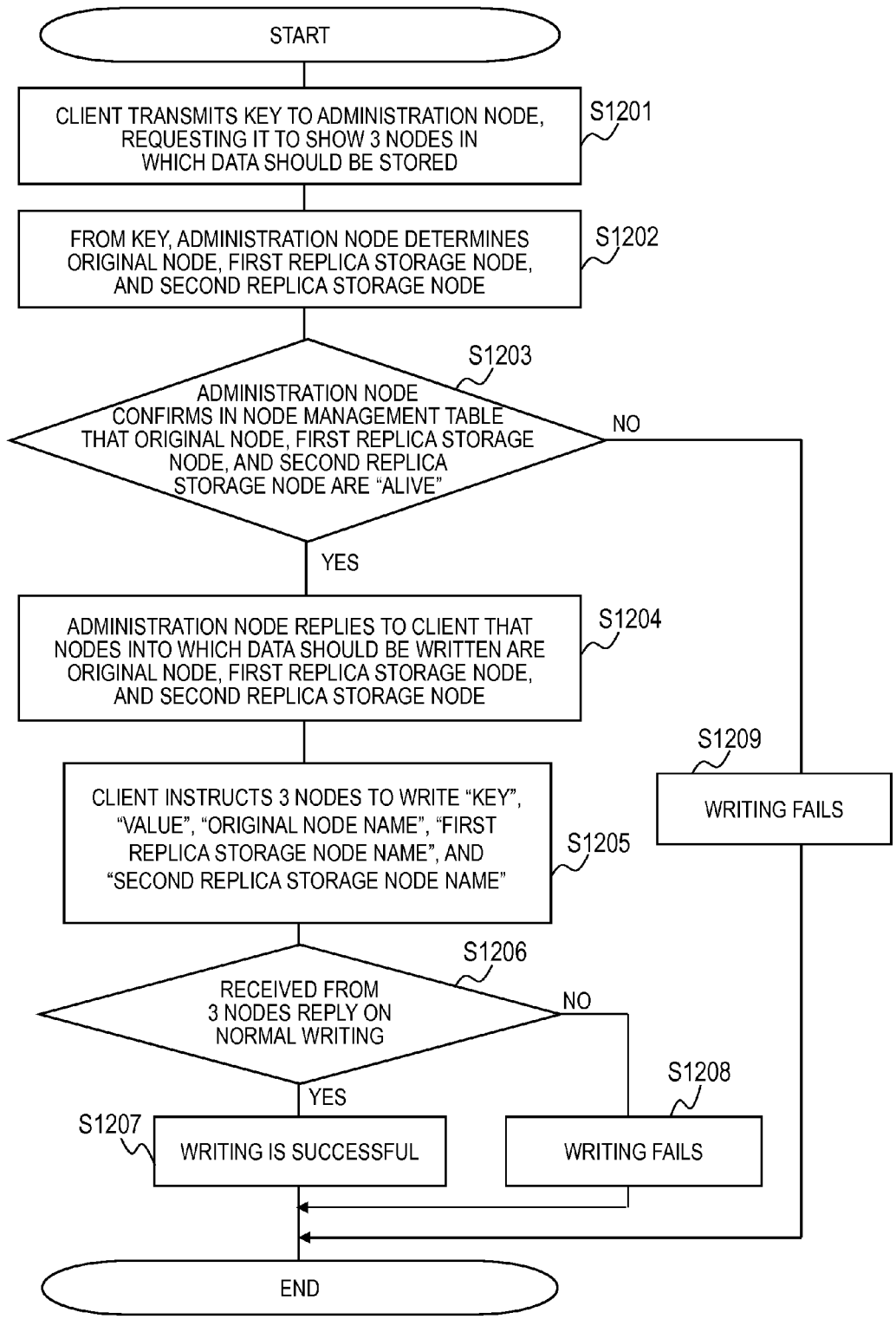
FIG. 12 is a flow chart showing an example of a processing in which a client writes a value by means of a key, in the first embodiment.
Figure 13:
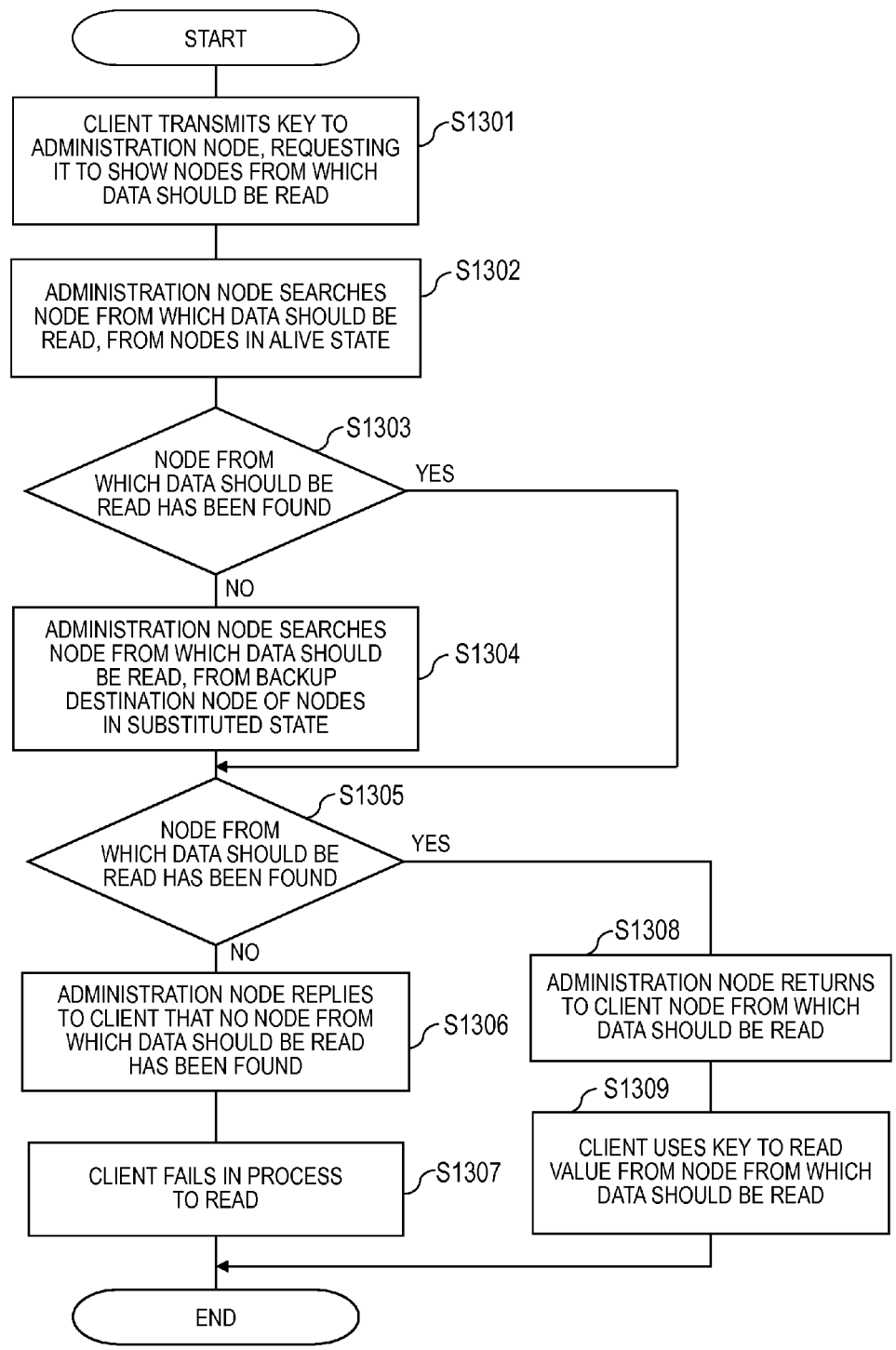
FIG. 13 is a flow chart showing an example of a processing in which the client reads information from the information storage system, in the first embodiment.
Figure 14:
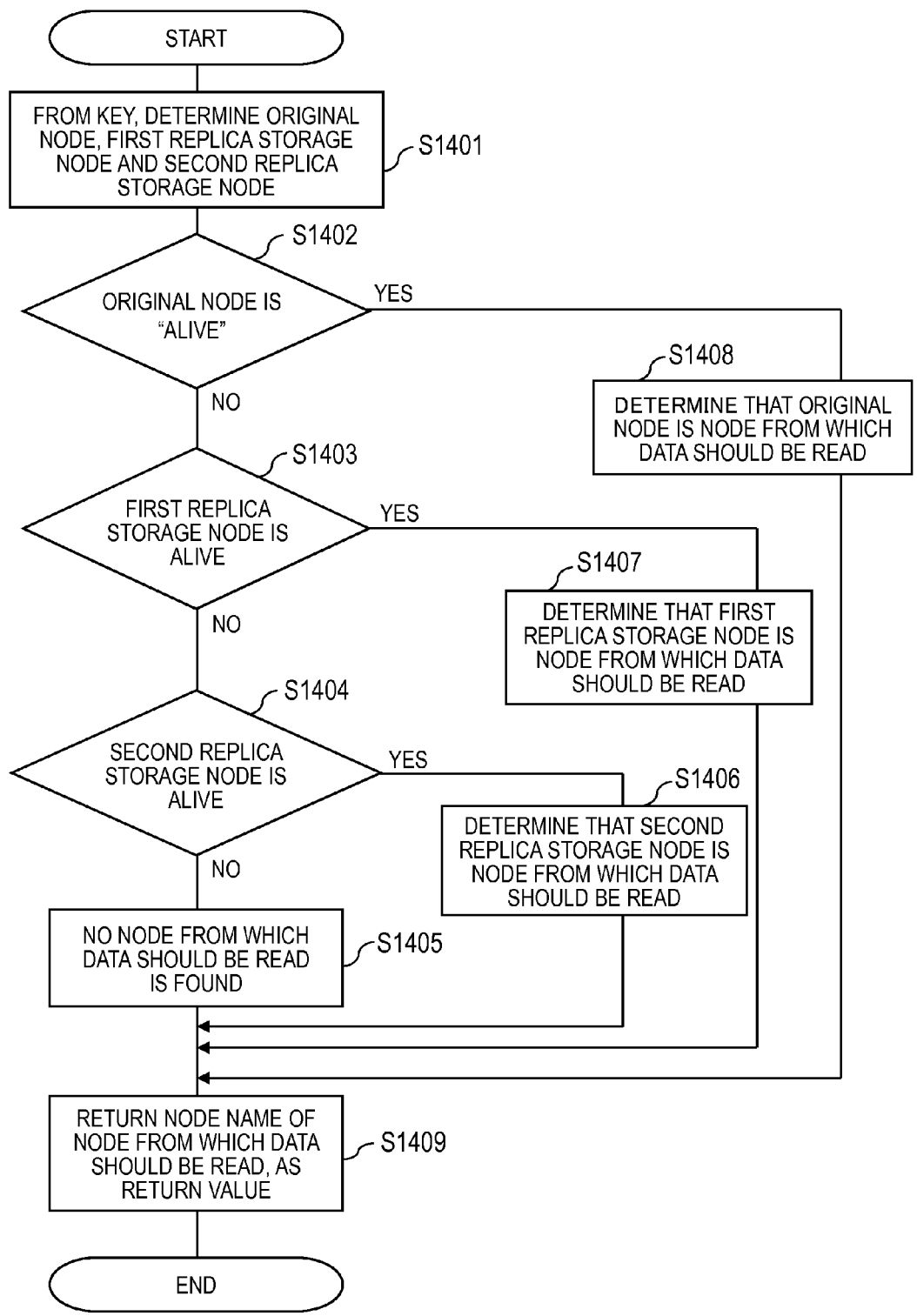
FIG. 14 is a flow chart of finding an information storage node from which data should be read, by using a key, from nodes in ALIVE state, in the first embodiment.
Figure 15:
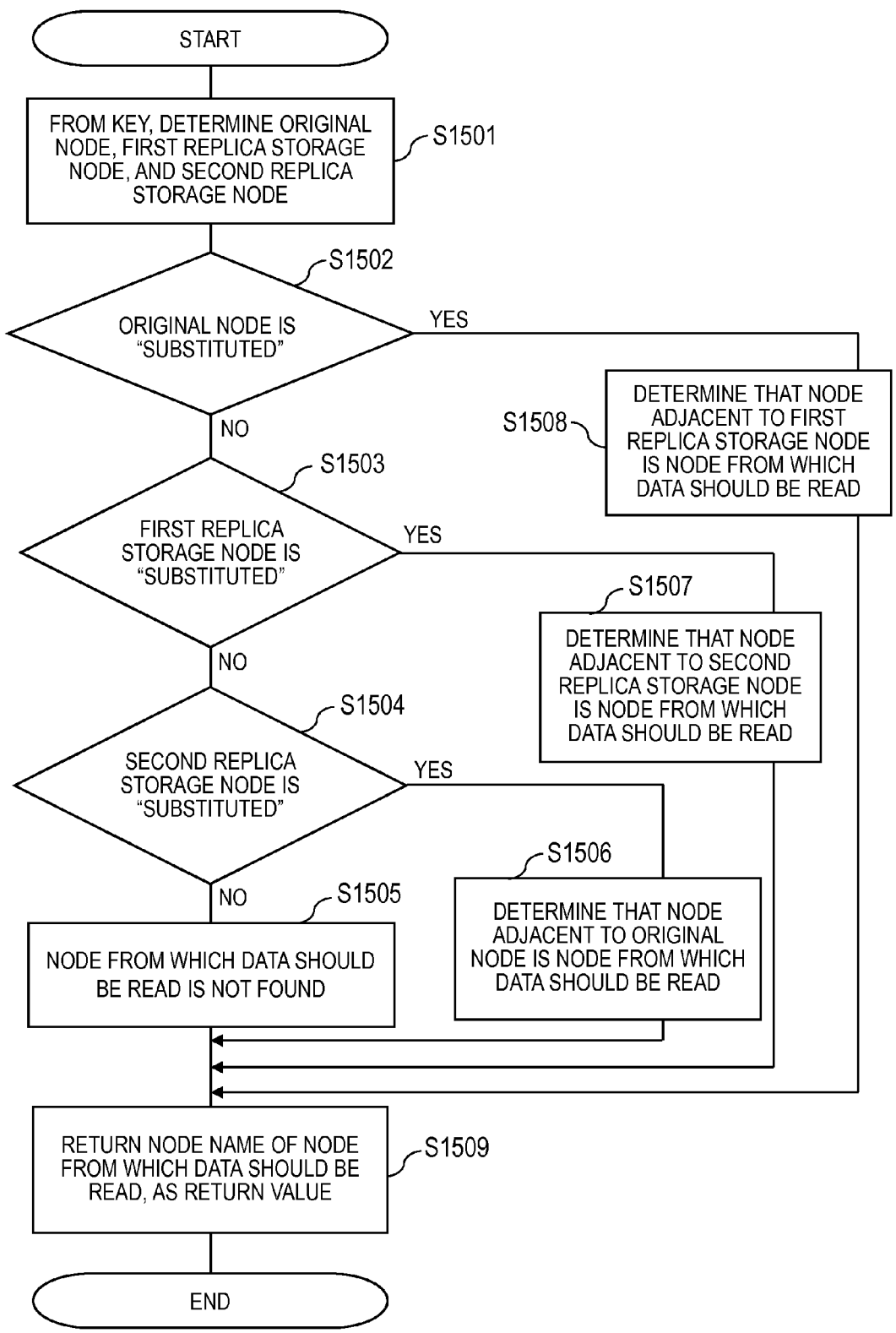
FIG. 15 is a flow chart showing an example of processing in which the information storage node from which data should be read is found by using a key from backup destination information storage nodes of information storage nodes in SUBSTITUTED state, in the first embodiment.
Figure 16:
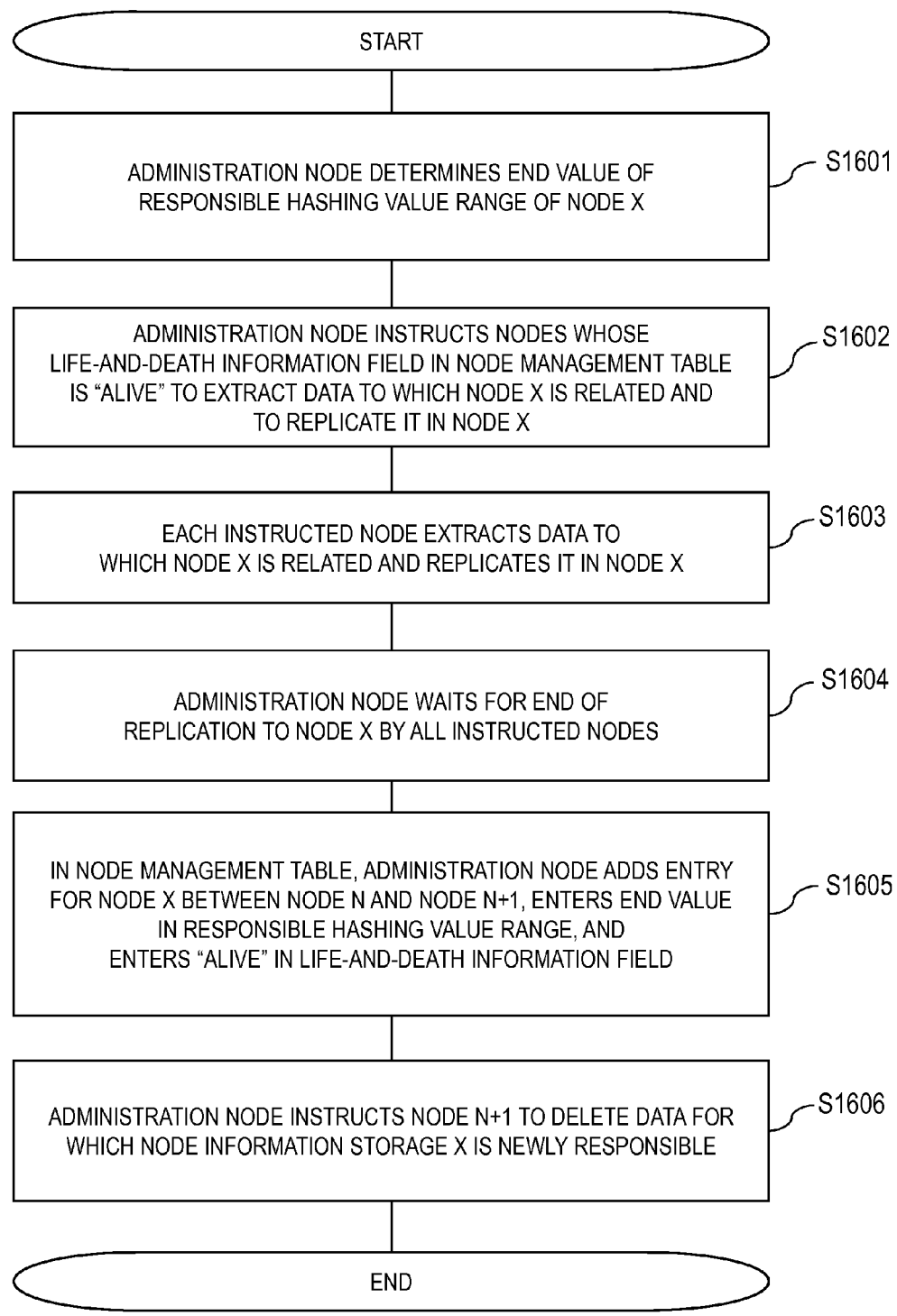
FIG. 16 is a flow chart showing a processing of inserting other information storage node between 2 information storage nodes in the first embodiment.
Figure 17:
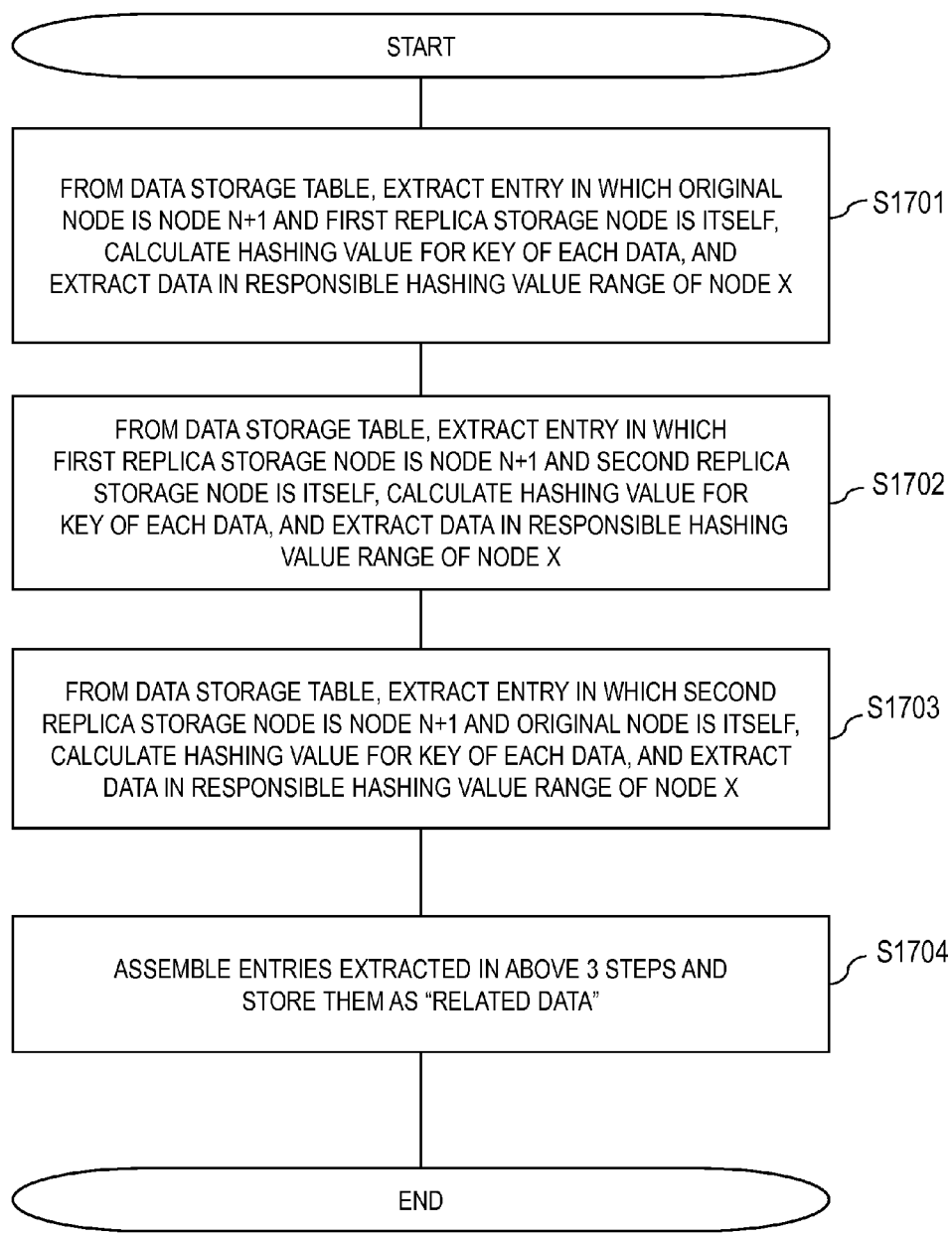
FIG. 17 is a flow chart showing a processing of extracting the data related to the inserted information storage node from the data stored by the information storage node.

FIG. 11 and FIG. 12 show examples of processing of writing data into the information storage node of the information storage system 209. FIG. 13 to FIG. 15 show examples of processing of reading data from the information storage node of the information storage system 209. FIG. 16 and FIG. 17 show examples of processing of inserting a node X between a node N (N being a node number) and a node N+1.

(Interruption of Information Storage Node)

First, with reference to FIG. 9, processing to be performed by the information storage system 209 when the node N dies will be described. When an information storage node dies, respective numbers of replications for data (typically, including a plurality of original data, a plurality of first replicas, and a plurality of second replicas) stored by the information storage node decrease only by 1 from a defined value (3 in this example).

In order to return the decreased replication value to the defined value, the information storage system 209 performs relocation of the data stored in the dead information storage node by replicating data identical to the data stored in the dead information storage node (its responsible data) to other information storage node, and returns the decreased replication value to the defined value.

FIG. 9 is a flow chart showing an example of processing of the information storage system 209 when the node N dies, focusing on processing of the administration node 4. In step S901, the node management program 245 of the administration node 204 detects that the node N has died.

Since technologies of detecting that the node N has died are widely known and thus a detailed description thereof will be omitted. Typically, the node management program 245 transmits to each information storage node a reply request for life-and-death monitoring, and determines that the information storage node has died when it does not receive a normal reply to the request.

In step S902, the node management program 245 changes the value of the life-and-death information field in the node N entry from "ALIVE" to "DEAD" in the node management table 248. The node management program 245 notifies the data relocation management program 247 of the administration node 204 that the node N has entered "DEAD" state.

In step S903, the data relocation management program 247 refers to the node management table 248 to identify information storage nodes whose life-and-death field is "ALIVE", and transmits to those information storage nodes an instruction for extracting data related to the node N of data stored by them and to replicate the extracted data to the information storage nodes adjacent to them (adjacent information storage nodes in the ALIVE state) in the clockwise direction.

Although they are not shown, the administration node 204 has addresses of respective information storage nodes and transmits the above-mentioned instruction to the addresses of the identified information storage nodes. The administration node 204 may transmit information specifying ALIVE information storage nodes adjacent to data replication destinations to respective information storage nodes in the ALIVE state or only to information storage nodes whose adjacent information storage nodes are not in the ALIVE state. Alternatively, each information storage node may obtain and retain a replicate of the node management table 248 from the administration node 204 on a regular basis and/or at the time of updating.

In step S904, the data relocation management program 247 waits till replications of the all information storage nodes end. Each information storage node can refer to the data storage table 218 to identify data related to the dead node N. The processing of extracting related data by the information storage nodes will be described in detail with reference to the flow chart in FIG. 10.

When the replications of the all information storage nodes end, the numbers of replications of respective data stored in the node N return to the defined value of 3. When the replication ends, each information storage node notifies the administration node 204 accordingly. In step S905, when receiving the notification on the end of replications of all information storage nodes, the data relocation management program 247 changes the entry for the node N in the life-and-death field in the node management table 248 from "DEAD" to "SUBSTITUTED".

Then, in step S906, the data relocation management program 247 instructs a node N+1 which is adjacent to the node N in the clockwise direction to collect data. Specifically, the data relocation management program 247 instructs the node N+1 to collect data (original data, a first replica and a second replica) for which the node N was responsible, from the information storage nodes whose life-and-death field in the node management table 248 is ALIVE. Specifically, the administration node 204 transmits to the node N+1 a data collection instruction involving identifiers of the information storage nodes in the ALIVE state.

In response to the instruction from the administration node 204, the data relocation processing program 217 of the node N+1 starts to collect the node N's responsible data. Specifically, the data relocation processing program 217 requests the information storage nodes in the ALIVE state which are shown by the instruction from the administration node 204 to transmit the replicated data ("related data" in step S903) to the node N+1.

Upon receipt of the request, the information storage nodes transmit the replicated data (data identical to the data which the node N stored (was responsible for)) to the requesting node N+1. Then, the data relocation processing program 217 changes the field of the "node N" to the "node N+1" in the data storage table 218. In addition, the operation may take such a form that it is performed by an instruction from the data relocation management program 247 after execution of step S907.

In step S907, when the node N+1 which is adjacent to the node N in the clockwise direction collects all of the node N's responsible data (receives the notification from the data relocation processing program 217 of the node N+1), the data relocation management program 247 deletes the entry for the node N from the node management table 248. The data relocation management program 247 may change the life-and-death field in the entry for the node N from "SUBSTITUTED" to "DELETED". With the above processing, the processing that the information storage system 209 should perform when the node N dies can be fulfilled.

Next, processing of the information storage node to extract the "related data" from data owned by it will be described with reference to FIG. 10. The processing is performed in step S904 in the flow chart of FIG. 9. Of data owned by the information storage node, the "related data" is the data a replicate of which the information storage node must transmit to the adjacent information storage node because other information storage node has died.

FIG. 10 is a view showing a flow chart of an example of processing to extract the related data of data owned by the information storage node. In step 51001, the data relocation processing program 217 of the information storage node extracts, from the data storage table 218, an entry in which the "original node" is the dead node N and the "first replica storage node" is itself.

In step S1002, the data relocation processing program 217 extracts, from the data storage table 218, an entry in which the "first replica storage node" is the dead node N and the "second replica storage node" is itself.

In step S1003, the data relocation processing program 217 extracts, from the data storage table 218, an entry in which the "second replica storage node" is the dead node N and the "original node" is itself.

In step S1004, the data relocation processing program 217 assembles the entries extracted in the above-mentioned 3 steps from S1001 to S1003 and stores them as the "related data" in the main memory 213. With the above processing, the information storage node can extract the "related data" of the data owned by it.

What has been described above is the flow of the data relocation processing involved in the deletion of the information storage node. In order to describe the processing in a more understandable manner, by way of example, processing when the information storage node 2 has died (i.e., processing till the information storage node 2 changes from the ALIVE state to the DEAD state and then to the SUBSTITUTED state) will be explained.

First, in step S901, the node management program 245 of the administration node 204 detects that the node 2 has died. In step S902, the node management program 245 changes the life-and-death field of the node 2 in the node management table 248 from "ALIVE" to "DEAD".

In step S903, the node management program 245 instructs the information storage nodes whose life-and-death field in the node management table 248 is "ALIVE" to extract the "related data", of the data stored by them and replicate it to the information storage node adjacent to them in the clockwise direction.

In the following, by way of example, processing of the node 4 will be described. The extraction was described in detail with reference to the flow chart of FIG. 10. The data storage table 218 which stores data of the node 4 was shown in FIG. 8. A specific description will be given. The processing to be described hereinafter with reference to FIG. 10 is performed by the data relocation processing program 217 of the node 4. In step S1001 in the flow chart of FIG. 10, the node 4 extracts an entry in which the "original node" is the dead node 2 and the "first replica storage node" is itself (information storage node 4) from the data storage table 218 of FIG. 8. For example, an entry 807 whose key is "Tokyo" is extracted. This is the data "Tokyo" 112 in FIG. 1.

In step S1002, the node 4 extracts an entry in which the "first replica storage node" is the dead node 2 and the "second replica storage node" is itself (information storage node 4) from the data storage table 218. For example, an entry 809 whose key is "Washington" is extracted.

In step S1003, the node 4 an entry in which the "second replica storage node" is the dead node 2 and the "original node" is itself (node 4) extracts from the data storage table 218. Such an entry does not exist in the entries clearly shown, except the omitted entry shown by the row 810.

In step S1004, the node 4 assembles the entries extracted from the above-mentioned 3 steps from step S1001 to step S1103 and stores them as the "related data" in a storage area of the main memory. In fact, the node 4 extracts the data with the key "Tokyo" and the data with the key "Washington" as the "related data". The data corresponds to the data set 121B in FIG. 1.

In this example, the node 4 replicates the extracted data to the adjacent node in the clockwise direction. Basically, the node 4 replicates the data to the node 5. This means that the data set 121B in FIG. 1 is replicated to the storage area 124. The node 5 may reserve the storage area 124 in advance or actively reserve it when performing replication.

If the node 5 reserves the storage area 124 in advance, the node 5 may reserve it as an "area for data of the node 4 for which "the original node is the dead node 2"" or an "area for some replicated data to be replicated from the node 4". Alternatively, the node 5 may reserve it as an "area to replicate some replicated data from an information storage node somewhere".

In addition, as examples of data then to be replicated similarly, FIG. 1 shows data to be replicated from the node 3 to the node 4, data to be replicated from the node 5 to the node 6, data to be replicated from the node 6 to the node 7, and data to be replicated from the node 1 to the node 3.

As described above, in this system, a data set being identical to a data set of an arbitrary category retained by one information storage node, and belonging to other category is distributed to and stored in a plurality of information storage nodes, rather than being concentrated in one other information storage node. In particular, use of a hash function whose bias is small enables data stored in one storage information node to be averagely allocated to all other information storage nodes.

Suppose that in the system, the node 2 has data of 3 TB. When the node 2 dies, an amount of data owned by any information storage node other than the node 2, such as the node 4 in the above example, as "data related to the node 2", is 3 GB which is one-thousandth of 3 TB (1000 is the total number of nodes). In step S903, the information storage nodes replicate the data to the adjacent information storage nodes. If the network is 1 Gbps, transfer time in the replication is about 24 seconds.

In fact, time taken to return the replication value from 2 to 3 is about 1/333 compared with the conventional example. Furthermore, in the processing described above, since load is evenly generated in the entire system rather than being concentrated only in some information storage nodes, there is no fluctuation in a response to a request from a client due to a reason like the conventional example. In addition, the probability of failure occurrence in information storage nodes due to the replication can also be reduced.

In the processing described above, following the data replications by the plurality of information storage nodes, the node N+1 collects the node N's responsible data. Since the replication value has already been recovered, the node N+1 can perform the data collection, depending on status of the system.

Thus, the embodiment can reduce the time needed to recover the replication value than ever before when the number of nodes for storing data in the system decreases. In addition, the embodiment can control concentration of system load till the replication value is recovered. Additionally, the embodiment can level any fluctuation in the system response time till the system returns to its steady state.

As described with reference to FIG. 10, information storage nodes extract data related to a node use of which is interrupted, in accordance with regulations set in advance. The regulations associate each category of data with other category. The information storage nodes identify a category of each data stored in the node use of which is interrupted and replicate data of a category associated with that category to other information storage nodes.

In the above example, the category of the original data is associated with the category of the first replica, the category of the first replica is associated with the category of the second replica, and the category of the second replica is associated with the category of the original data. The association is one example, and other correspondence may be acceptable.

The above configuration detects that the node N has died, determines that the node N is an unusable node, and stops use of the information storage node. Unlike this, the administration node 204 may detect that the response time of the node N is longer or that CPU load of the node N is higher than a threshold. Alternatively, the administration node 204 may detect any condition which is different from other normal condition.

Although the above configuration detects that the node N has died and determines that the node N is an unusable node, it may determine that the node N is an unusable node from a state of any information storage node other than the node N. For example, if the node N belongs to a specific node group G, the information storage system may detect that the node group G enters a state which is different from the normal state, determine that the node N or one or more information storage nodes belonging to the node group G are unusable nodes, and perform replication. The information storage system may detect that the node N enters a state which is different from the normal state, determine that some or all of the information storage nodes in the node group G are unusable nodes, and perform replication.

In the above example, the node N died due to an unpredictable failure. Even if the node N is stopped as scheduled, the data replication as described above can be similarly applied. In this case, the node N may operate from step S901 to step S907, following which use of the node N will be stopped.

In the above processing, respective information storage nodes replicate data related to the node N to the storage information nodes which are located in logically adjacent positions. Relative logical positions of the information storage nodes for which respective information storage nodes replicate data may be other positions. For example, they may be every other or every third information storage node, or an information storage node on the opposite side of the logical circle. Alternatively, information storage nodes at data replication destinations may be determined with some function f.

If it is possible to learn a replication destination node later, the information storage node may use a method for determining an information storage node for replication destination by using a random number or by considering load of each information storage node and replicating to a node with small load. In this case, a table may be provided so that a name of a node (or a node ID) which is a destination of replication can be learned from a name of a node (or a node ID) which is a source of replication.

With autonomous replication of data (extraction of replicated data and replication to other information storage nodes) involved in interruption of use an information storage node being performed by information storage nodes, prompt and efficient processing is enabled. Unlike this, the administration node 204 may instruct each information storage node on information storage nodes which are destinations of replications.

In the above configuration, the information storage nodes replicate data related to the node N to the information storage nodes located at specified relative positions. Information storage nodes at replication destinations may store data identical to the replicated data. In this case, the replication value of the identical data remains unchanged at 2 and does not revert to 3. Thus, a new replication destination node is determined with a method similar to a method to be described below with reference to FIG. 11. This secures the replication value of 3.

Since the possibility (frequency of occurrence) that replication destination nodes store identical data is small, the data may be replicated to specified information storage nodes, irrespective of whether or not there is the identical data. Unlike this, if information storage nodes at specified relative positions store the identical data, the information storage node may replicate the data to an information storage node which is different from it, for example, an information storage node adjacent to the information storage node storing the identical data. By referring to the data storage table 218, the information storage node can identify the information storage node which stores the data identical to the data to be replicated.

In the above configuration, the node N+1 adjacent to the node N in the clockwise direction is newly responsible for the node N's responsible range. Unlike this, for example, a node X (which has been reserved as a spare) is added in place of the node N, and the node X may collect data for which the information storage node N was originally responsible, and then perform the processing for which the node N was originally responsible. This enables the information storage system to return to the state prior to the interruption of the use of the node N. A plurality of existing information storage nodes or a plurality of information storage nodes including a newly added information storage node may collect data.

In the above example, the node N+1 acquires data identical to the replicated data from the information storage node in which the data is replicated. The node N+1 may collect node N's responsible data, from any information storage node. For example, from the information storage nodes at the replication destinations, the node N+1 can acquire data stored in their storage areas (for example, the storage area 124 of the node 5 in FIG. 1). In addition to this, the information storage system 209 may finish the processing without collecting responsible data of the interrupted node in one information storage node, after causing a plurality of information storage nodes to replicate the data related to the interrupted node (after recovering the replication value).

(Writing of Data)

In the following, processing of writing data to the information storage system 209 will be described with reference to FIG. 11 and FIG. 12. First, with reference to FIG. 11, processing of the read-write management program 246 of the administration node 204 to determine an information storage node in which data is stored (written) from a key value will be described.

FIG. 11 shows a flow chart of processing of the read-write management program 246 to determine a storage node from a key value. In step S1101, the read-write management program 246 calculates a hash value of a key from a defined hash function and a key received from a client.

Furthermore, the read-write management program 246 uses the hash value to search an original node in the node management table 248. As a hash function to be used by the read-write management program 246, any one of or a combination of a plurality (of functions) of MD5, SHA-1, SHA-256 and the like may be used. Any function other than them may also be used.

In step S1102, the read-write management program 246 calculates a hash value (computed value) by using an arithmetic expression which combines "1" to the key and substitutes the value into the hash function. The hash function to be used is identical to the function for determination of the original node. The read-write management program 246 uses the hash value to search a candidate for a first replica storage node in the node management table 248. The computation of combining "1" to the key generates a character string "Tokyo 1" if the key is "Tokyo", for example, and a character string "New York 1" if the key is "New York", for example.

In step S1103, the read-write management program 246 checks if the original node is equal to the candidate for the first replica storage node. If the original node and the candidate for the first replica storage node are equal (S1103: YES), the read-write management program 246 proceeds to step S1104. If the original node and the candidate for the first replica storage node are not equal (S1103: NO), the read-write management program 246 proceeds to step S1105.

In step S1104, the read-write management program 246 determines that the first replica storage node is a node adjacent to the candidate for the first replica storage node in the clockwise direction. In step S1105, the read-write management program 246 determines that the first replica storage node is the candidate node for the first replica storage node.

In step S1106, the read-write management program 246 combines "2" to the key to calculate its hash value. The hash function is same as the above-mentioned function. Using the hash value, the read-write management program 246 searches a candidate for a second replica storage node in the node management table 248.

In step S1107, the read-write management program 246 checks if the original node or the first replica storage node is equal to the candidate for the second replica storage node. If the original node or the first replica storage node is equal to the candidate for the second replica storage node (S1107: YES), the read-write management program 246 proceeds to step S1108. If the candidate for the second replica storage node is not equal to any of the original node and the first replica storage node (S1107: NO), the read-write management program 246 proceeds to step S1109.

In step S1108, the read-write management program 246 determines that a new candidate for the second replica storage node is a node adjacent to the last candidate for the second replica storage node in the clockwise direction. In step S1109, the read-write management program 246 determines that the second replica storage node is the candidate node for the second replica storage node.

With the processing described above, the storage node can be determined from the key value. In addition, in the above example, although the "key", the "value obtained by combining 1 to the key", and the "value obtained by combining 2 to the key" were used to search the "original node", the "first replica storage node", and the "second replica storage node", other character string may be combined or a key character string may be changed according to a certain law. For example, the read-write management program 246 can shift the character strings, specifically, change "Tokyo" to "OKYOT" or "KYOTO".

Alternatively, rather than changing the key, the read-write management program 246 may use a different hash value to determine a different candidate node. For example, it can calculate MD5 ("New York") to search the original node, calculate SHA-1 ("New York") to search the first replica storage node, and calculate SHA-256 ("New York") to search the second replica storage node. Or, the read-write management program 246 may take a form of a combination of them.

In the configuration example, the system determines a plurality of information storage nodes for storing identical data, by repeatedly substituting a value into the same hash function for different numbers of times. For example, the configuration is such that "SHA1 (KEY)" is used to determine the original node, "SHA1 (SHA1 (KEY))" is used to determine the first replica node, and "SHA1 (SHA 1 (SHA 1 (KEY)))" is used to determine the second replica node. This enables even a system with a large replication value to easily and appropriately determine a plurality of information storage nodes for storing data. In addition, this also makes it possible to easily cope with an increase in the replication value of the system.

Next, processing of the client 207 in writing of data will be described with reference to FIG. 12. Processing of other clients is also similar. FIG. 12 shows a flow chart for the client 207 to write a value (and a key) by using the key. The flow chart includes steps of the administration node 204 and the client 207.

In step S1201, the read-write client program 277 transmits a "key" to the administration node 204, requesting it to show 3 information storage nodes in which data should be stored. In step S1202, the administration node 204 determines from the "key" that the 3 information storage nodes in which data should be stored are an "original node", a "first replica storage node" and a "second replica storage node".

In step S1203, using the node management table 248, the administration node 204 checks if the "original node", the "first replica storage node", and the "second replica storage node" are all "ALIVE".

If the administration node 204 can confirm from the node management table 248 that the "original node", the "first replica storage node", and the "second replica storage node" are all "ALIVE" (S1203: YES), the processing proceeds to step S1204. If the administration node 204 cannot confirm from the node management table 248 that any one of the "original node", the "first replica storage node", or the "second replica storage node" is "ALIVE" (S1203: NO), the processing proceeds to step S1209.

In step S1204, the administration node 204 replies to the client 207 that the nodes to which data should be written are the 3 nodes: "original node", the "first replica storage node", and the "second replica storage node".

In step S1205, the read-write client program 277 of the client 207 instructs the 3 nodes shown as the nodes to which the data should be written to write a "key", a "value", an "original node name", a "first replica storage node name", and a "second replica storage node name".

In step S1206, the read-write client program 277 checks if the administration node 204 has received a reply from the 3 information storage nodes that it could normally perform the writing. If it receives a reply from the 3 information storage nodes that it could normally perform the writing (S1206: YES), the processing proceeds to step S1207. If it cannot receive a reply from any one of the 3 information storage nodes that it could normally perform the writing (S1206: NO), the processing proceeds to step S1208.

In step S1207, the read-write client program 277 determines that the writing is successful. In step S1208, the read-write client program 277 determines that the writing has failed. In step S1209, the read-write client program 277 determines that the writing has failed. A description of processing of coping with a judgment on failure of writing is omitted since it is not highly relevant to the present invention. What has been described above is the flow of the processing. In order to describe the processing in a more understandable manner, by way of example, processing of the client 207 to store the data "Tokyo" 110 will be explained. First, in step S1201, the client 207 transmits the "key" to the administration node 204, requesting it to show 3 information storage nodes to which data should be stored.

Then, in step S1202, the administration node 204 searches from "Tokyo", which is the key", nodes in which the data should be stored. This is the processing illustrated in FIG. 11. The administration node 204 determines the "original node" by substituting the key "Tokyo" into the hash function, determines the "first replica storage node" by substituting the key "Tokyo 1" into the hash function, and determines the "second replica storage node" by substituting the key "Tokyo 2" into the hash function. (Processing when the hash values collide is as described in FIG. 11.)

In this example, suppose that "300" is obtained as the hash value for "Tokyo", "1000" as the hash value for "Tokyo 1", and "3000" as the hash value for "Tokyo 2". Then, in step S1203, using the node management table 248, the administration node 204 checks if the original node, the first replica storage node, and the second replica storage node are all in the ALIVE state.

The node management table 248 of FIG. 6 shows that the node 2 is responsible for the range from 227 to 535. The administration node 204 determines that the "original node" with the hash value being 300 is the information storage node 2. The life-and-death information thereof is "ALIVE". Similarly, the "first replica storage node" with the hash value being 1000 is the information storage node 4. The life-and-death information thereof is "ALIVE". Similarly, the life-and-death information of the "second replica storage node" with the hash value being 3000 is "ALIVE". Since the 3 information storage nodes are "ALIVE", the processing proceeds to step S1204.

Then, in step S1204, the administration node 204 replies to the client 207 that the original node, the first replica storage node, and the second replica storage node are the node 2, the information storage node 4, and the information storage node 7, respectively.

Then, in step S1205, the client 1207 instructs the 3 information storage nodes (the information storage node 2, the information storage node 4, the information storage node 7) shown as the information storage node into which data should be written to write "Tokyo" as the "key", "fine" as the "value", the "node 2" as the "original node name", the "node 4" as the "first replica storage node name", and the "node 7" as the "second replica storage node name".

Then, in step S1206, the administration node 204 receives from the 3 information storage nodes (the node 2, the node 4, the node 7) a reply that it could normally perform the writing. When the administration node 204 receives from the 3 information storage nodes the reply that it could normally perform the writing, the processing proceeds to step S1207. Lastly, in step S1207, the client 207 determines that the writing is successful. With the above processing, the client 207 can write the data "Tokyo" 110 into the information storage system 209.

If the information storage node which was selected with the method described above and into which data is written is in the DEAD state or the SUBSTITUTED state, the processing of writing fails. Unlike this, if the selected information storage node into which data is written is in the SUBSTITUTED state, the information storage node 209 may write data to a specific information storage node.

For example, the administration node 204 returns identifiers of 2 ALIVE information storage nodes to the client 207. The client 207 writes data into the 2 information storage nodes. Like the processing described with reference to FIG. 9 and FIG. 10, the information storage node which stores data of a category (for example, the second replica) pre-associated with a category (for example, the first replica) of the data which should be stored in the information storage node in the SUBSTITUTED state replicates the data in an information storage node to an adjacent logical position.

(Reading of Data)

In the following, processing of the clients 207, 208 to read data from the information storage system 209 will be described with reference to FIG. 13 to FIG. 15. In the following, an example of processing of the client 207 will be described. FIG. 13 shows a flow chart of an example of processing whereby the client 207 reads information from the information storage system 209. In step S1301, the read-write client program 207 of the client 207 conveys the "key" to the administration node 204, requesting it to show nodes from which data should be read.

In step S1302, the administration node (the read-write management program 246) searches nodes from which data should be read, from information storage nodes in the ALIVE state, through processing (to be described below) as shown in FIG. 14. In step S1303, the read-write management program 246 checks if the information storage node from which data should be read is found. If the information storage node from which data should be read is not found (S1303: NO), the processing proceeds to step S1304. If information storage node from which data should be read is found (S1303: YES), the processing proceeds to step S1305.

In step S1304, the read-write management program 246 searches a node from which data should be read, from information storage nodes at backup destinations of information storage nodes in the SUBSTITUTED state, through processing as shown in FIG. 15 (to be described below). In step S1305, the administration node 204 checks if a nodes from which data should be read have been found. If the node from which data should be read has not been found (S1305: NO), the processing proceeds to the step S1306. If the node from which data should be read has been found (S1305: YES), the processing proceeds to step S1308.

In step S1306, the read-write management program 246 replies to the client 207 that the information storage node from which data should be read is not found. In step S1307, the read-write client program 207 of the client 270 determines that the processing of reading has failed.

In step S1308, the read-write management program 246 replies to the client 207 about the information storage nodes from which data should be read. In step S1309, the read-write client program 277 of the client 207 uses the key to read the value from the node from which data should be read. With the above processing, the client 207 can read information from the information storage system 209.

Then, processing of using a key to find an information storage node from which data should be read, from nodes in ALIVE state will be described hereinafter with reference to FIG. 14. FIG. 14 shows a flow chart of processing in which the administration node 204 uses a key to find a node from which data should be read, from nodes in ALIVE state.

In step S1401, the read-write management program 246 of the administration node 204 determines an original node, a first replica storage node, and a second replica storage node from the key. Details of the processing are as per the description with reference to FIG. 11.

In step S1402, the read-write management program 246 checks whether the original node is "ALIVE" or not. If the original node is not "ALIVE" (S1402: NO), the processing proceeds to step S1403. If the original node is "ALIVE" (S1402: YES), the processing proceeds to the step S1408.

In step S1403, the read-write management program 246 checks whether the first replica storage node is "ALIVE" or not. If the first replica storage node is not "ALIVE" (S1403: NO), the processing proceeds to step S1404. If the first replica storage node is "ALIVE" (S1403: YES), the processing proceeds to step S1407.

In step S1404, the read-write management program 246 checks whether the second replica storage node is "ALIVE" or not. If the second replica storage node is not "ALIVE" (S1404: NO), the processing proceeds to step S1405. If the second replica storage node is "ALIVE" (S1404: YES), the processing proceeds to step S1406.

In step S1405, the read-write management program 246 determines that information storage node from which data should be read is not found. In step S1406, the read-write management program 246 determines that the second replica storage node is the information storage node from which data should be read.

In step S1407, the read-write management program 246 determines that the first replica storage node is the information storage node from which data should be read. In step S1408, the read-write management program 246 determines that the original node is the information storage node from which data should be read.

In step S1409, the read-write management program 246 returns a node name of the information storage node from which data should be read, as a return value (If it is not found, the read-write management program 246 returns a reply that "the information storage node is not found".) With the above processing, the read-write management program 246 can find a node from which data should be read, from nodes in the ALIVE state, by using a key.

Next, processing in which the administration node 204 finds a node from which data should be read from information storage nodes in the SUBSTITUTED state by using a key will be described with reference to FIG. 15. FIG. 15 is a flow chart showing an example of processing of using a key to find an information storage node from which data should be read from information storage nodes which are backup destinations of information storage nodes in the SUBSTITUTED state.

In step S1501, from a key, the read-write management program 246 determines an original node, a first replica storage node, and a second replica storage node. Details of the processing are as shown in FIG. 11.

In step S1502, the read-write management program 246 checks whether the original node is "SUBSTITUTED" or not. If the original node is not "SUBSTITUTED" (S1502: NO), the processing proceeds to step S1503. If the original node is "SUBSTITUTED" (S1502: YES), the processing proceeds to step S1508.

In step S1503, the read-write management program 246 checks whether or not the first replica storage node is "SUBSTITUTED". If the first replica storage node is not "SUBSTITUTED" (S1503: NO), the processing proceeds to step S1504. If the first replica storage node is "SUBSTITUTED" (S1503: YES), the processing proceeds to step S1507.

In step S1504, the read-write management program 246 checks whether the second replica storage node is "SUBSTITUTED" or not. If the second replica storage node is not "SUBSTITUTED" (S1504: NO), the processing proceeds to step S1505. If the first replica storage node is "SUBSTITUTED" (S1504: YES), the processing proceeds to step S1506.

In step S1505, the read-write management program 246 determines that an information storage node from which data should be read is not found. In step S1506, the read-write management program 246 determines that a node adjacent to the original node is the information storage node from which data should be read.

In step S1507, the read-write management program 246 determines that a node adjacent to the second replica storage node is the information storage node from which data should be read. In step S1508, the read-write management program 246 determines that a node adjacent to the first replica storage node is the information storage node from which data should be read.

In step S1509, the read-write management program 246 returns a node name of the information storage node from which data should be read, as a return value. (If it is not found, the read-write management program 246 replies that "the information storage node is not found".) With the above processing, the read-write management program 246 can find the node from which data should be read, from the nodes in the SUBSTITUTED state, by using the key.

What has been described is the flow of the processing. In order to describe the processing in a more understandable manner, by way of example, processing of the client 207 to read the data "Tokyo" 110 will be explained. First, in step S1301, the client 207 transmits "Tokyo", which is the "key", to the administration node 204, requesting it to show an information storage node from which data should be read.

Then, in step S1302, through the processing as shown in FIG. 14, the administration node 204 searches the information storage node, from which data should be read, from information storage nodes in the ALIVE state. In step S1401, the administration node 204 calculates hash values from "Tokyo", "Tokyo 1", and "Tokyo 2", and obtains the "node 2", the "node 4", and the "node 7" from the node management table 248.

In step S1402, the administration node 204 searches a life-and-death state of the node 2 in the node management table 248. Since the node 2 is in the "ALIVE" state, the administration node determines in step S1408 that the information storage node from which data should be read is the information storage node 2.

In step S1303, the administration node 204 checks if the information storage node from which data should be read is found. Since it is found, the processing proceeds to step S1305. In step S1305, the administration node 204 checks if the information storage node from which data should be read is found. Since it is found, the processing proceeds to step S1308.

In step S1308, the administration node 204 replies to the client 207 that the information storage node from which data should be read is the information storage node 2. Then, in step S1309, the client 207 uses the key "Tokyo" to read a value from the information storage node 2 from which data should be read. With the above processing, the client 207 can read information from the information storage system 209.

(Addition of Information Storage Node)

Next, processing of inserting a node X between the node N and the node N+1 will be described with reference to FIG. 16 and FIG. 17. FIG. 16 is a flow chart showing an example of processing of inserting a node X between the node N and the node N+1.

In step S1601, the node management program 245 of the administration node 204 determines an "end value of a responsible hash value range" of the node X. This is a value between an end value of a responsible hash value range of the node N and an end value of a responsible hash value range of the node N+1.

In step S1602, the node management program 245 instructs the information storage nodes whose life-and-death state field in the node management table 248 is "ALIVE" to extract data to which the node X is related of data owned by them and replicate (transmit) it to the node X. The responsible hash value range of the node X is added to the instruction.

In step S1603, respective information storage nodes which receive the instruction extract data to which the node X is related from the data owned by them, and replicate it to the node X. The processing will be described with reference to the flow chart in FIG. 17.

In step S1701, the data relocation processing program 217 of each information storage node extracts, from the data storage table 218, an entry in which the original node is the node N+1 and the first replica storage node is itself. In addition, the data relocation processing program 217 calculates a hash value for a key extracted by each information storage node and extracts data in the responsible hash value range of the node X. In this example, the data relocation processing program 217 knows a computation method for determining the original node, the first replica storage node, and the second replica storage node (specified in the program).

In step S1702, the data relocation processing program 217 of each information storage node extracts, from the data storage table 218, an entry in which the first replica storage node is the node N+1 and the second replica storage node is itself. In addition, the data relocation processing program 217 calculates a hash value for a key of data extracted by each information storage node and extracts data in the responsible hash value range of the node X.

In step S1703, the data relocation storage program 217 extracts, from the data storage table 218, an entry in which the second replica storage node is the node N+1 and the original node is itself. Furthermore, the data relocation processing program 217 calculates a hash value for a key of data extracted by each information storage node and extracts data in the responsible hash value range of the node X.

In step S1704, the data relocation processing program 217 assembles the entries extracted in the 3 steps described above, and stores them as "related data" in a storage area of the main storage device. The data relocation processing program 217 replicates the data extracted from step S1701 to step S1704 to the node X. The data relocation processing program 217 inserts the node X as well as updates the data storage table 218.

With reference back to FIG. 16, in step S1604, the node management program 245 of the administration node 204 waits for termination of replications to the node X by all of the instructed information storage nodes. In step S1605, the node management program 245 adds an entry for the node X between the node N and the node N+1 in the node management table 248, enters an end value of responsible hash value range, and enters "ALIVE" in the life-and-death field.

In step S1606, the node management program 245 instructs the node N+1 to delete data for which the node X is newly responsible. With the above processing, the processing of inserting the node X between the node N and the node N+1 can be fulfilled. In contrast to the processing of replicating data only from the node N+1 to the node X, the processing enables distribution of the replications among a plurality of information storage nodes, thus being able to reducing load per information storage node.

<Second Embodiment>

Figure 18:
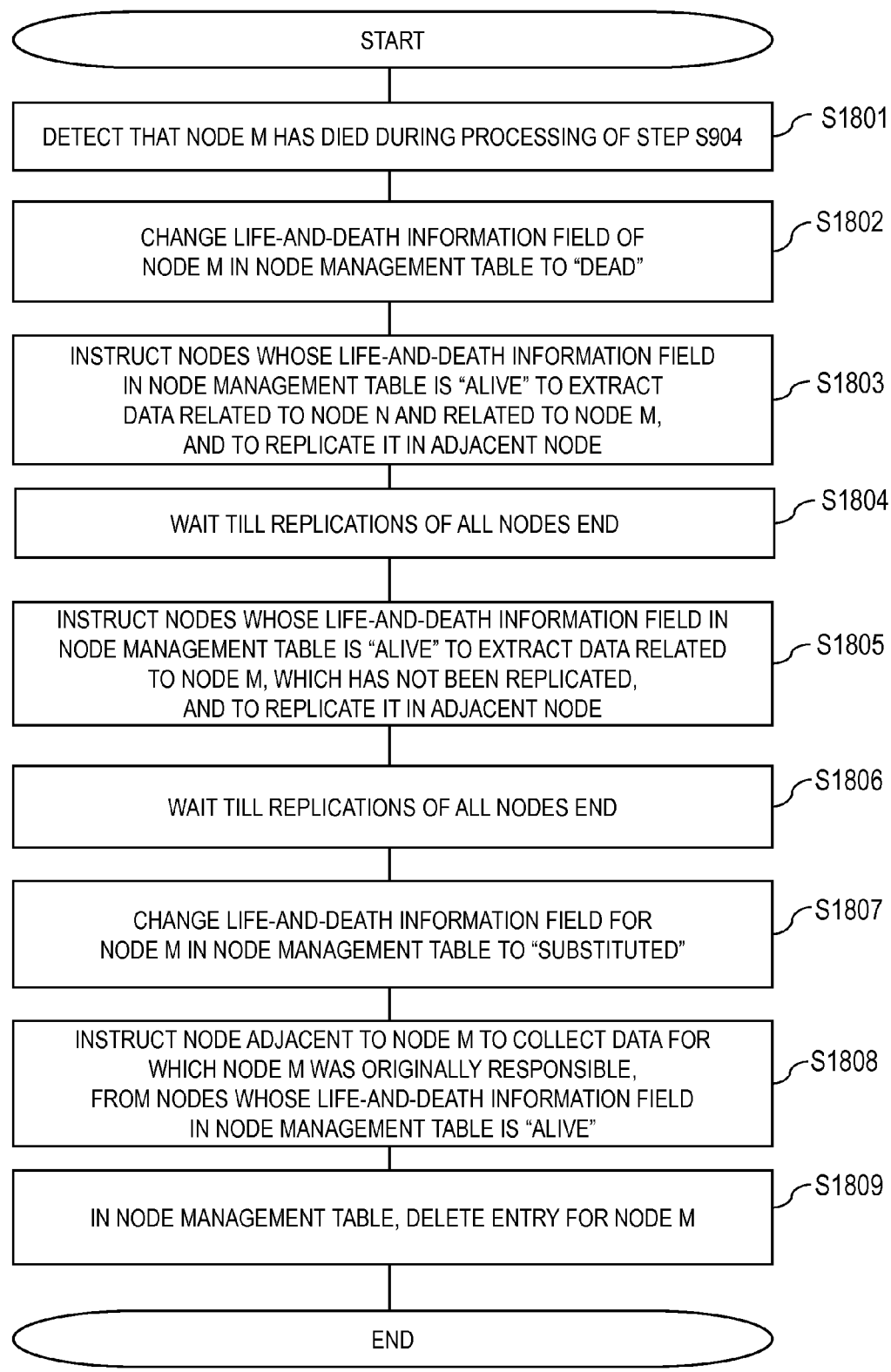
FIG. 18 is a flow chart showing a processing when another information storage node dies while data relocation resulted from death of an information storage node is being executed, in a second embodiment.

The embodiment describes processing to be performed when a failure further occurs in the course of the processing to recover the replication value in the first embodiment. FIG. 18 is a flow chart showing an example of processing when a node M dies during execution of the step S904 of the flow chart shown in FIG. 9.

In step S1801, the node management program 245 of the administration node 204 detects that the node M has died during execution of the step S904. In step S1802, the node management program 245 changes the life-and-death information field of the entry for the node M in the node management table 248 from "ALIVE" to "DEAD".

In step S1803, the data relocation management program 247 of the administration node 204 instructs information storage nodes whose life-and-death information field is "ALIVE" in the node management field 248 to extract data related to both node N and node M of data owned by them, and replicate it to the information storage nodes adjacent to them. The data relocation management program 247 gives an instruction that this instruction takes precedence over the instruction for replicating of the step 903.

The replication value of data for which the node N and the node M are both responsible (for example, data for which the node N is the original node and the node M is the first replica storage node) decreases from 2 to 1 when the node M dies. On the one hand, the replication value of data which is related to only one of the node N or the node M (only one of them is responsible for), specifically, data of the original data and either the first replica or the second replica stored by only one of them is 2.

Thus, since the replication value of the data for which the node N and the node M are both responsible is smaller than the replication value of other data, it is important to increase the replication value of the former data in preference to the latter data. Hence, as one method, the embodiment gives priority to extraction and replication of the data related to both node M and node N of the data owned by the information storage node, over the instruction for replicating in the step S903.

In the data storage table 218, each information storage node searches an entry including both node N and node M and replicates the entry to the information storage node adjacent to it. The entry including both the node N and the node M satisfies the regulation of "related data" described for any of the node N or the node M, with reference to FIG. 10. In step S1804, the administration node 204 waits for termination of the replications of data related to both node M and node N by all the information storage nodes. With the steps described so far, the replication value of the data whose number of replication is 1 is increased to 2 only by 1.

In step S1805, the data relocation management program 247 instructs the information storage nodes whose life-and-death field in the node management table 248 is "ALIVE" to extract data related to the node M of data owned by them and replicate it to the information storage nodes adjacent to them. The instruction only applies to the data that has not been replicated, specifically, the data for which the node N is not responsible, of the data related to the node M.

Specification of data related to the node M follows the regulation shown in FIG. 10. Specifically, as described with reference to FIG. 10, the first replica, the second replica and the original data of the original data, the first replica and the second replica stored by the node M are the data related to the node M. In entries of these data, entries which do not include the node N are the entries that have not been replicated.

The data relocation management program 247 may be in such a form that it gives priority to either data only node M is related or data to only node N is related to. Shortly, the information storage node may be in such a form that it first replicates either the data only node M is related to or the data only node N is related to.

In the data storage table 218, each information storage node replicates, to the adjacent information storage node, an entry which includes the node M but does not include the node N and which satisfies the regulation described with reference to FIG. 10. In step 1806, the data relocation management program 247 waits termination of step S1805 by all of the information storage nodes.

In step S1807, the data relocation management program 247 changes the life-and-death information in the entry for the node M in the node management table 248 from "DEAD" to "SUBSTITED". With the steps described so far, the replication value of the data for which the node M is responsible and for which the node N is not responsible can be returned to the defined number of 3.

After step S1806 and step S1807 in the flow chart of FIG. 9, in step S1808, the data relocation management program 247 instructs the node M+1 which is adjacent to the node M to collect data for which the node M was originally responsible from information storage nodes whose life-and-death information field in the node management table 248 is "ALIVE".

Specifically, the data relocation management program 247 transmits to the node M+1 the instruction for collecting data, together with information identifying the "ALIVE" information storage nodes. The instruction may precede or follow the instruction for collecting the node N's responsible data. The node M+1 requests the information storage nodes in the ALIVE state to transmit (replicate) the replicated node M's responsible data (the data replicated in response to death of the node M).

In step S1809, when the node M+1 adjacent to the node M collects all the data for which the node M was originally responsible, the data relocation management program 247 deletes the entry for the node M in the node management table 248. The data relocation management table 247 may change the value in the life-and-death information field of the entry for the node M from "SUBSTITUTED" to "DELETED".

Although the above processing replicates data identical to data stored in both node N and node M to only one information storage node, the data may be replicated to 2 different information storage nodes. This can return the replication value of the data stored in both node N and node M to 3.

What has been described so far is the flow of the processing. In order to describe the processing in a more understandable manner, by way of example, processing when the node 5 dies during execution of the step 904 for the dead node 2 will be explained hereinafter.

In step S1801, during execution of the step 904, the administration node 4 detects that the information storage node 5 has died. Then, in step S1802, the administration node 204 changes the life-and-death field for the node 5 in the node management table 248 to "DEAD".

Then, in step S1803, the administration node 204 instructs information storage nodes whose life-and-death information field in the node management table 248 is "ALIVE" to extract data related to both node 2 and node 5 and replicate it to the information storage nodes adjacent to them. The administration node 204 gives an instruction that this instruction takes precedence over the instruction of the step S903.

Upon receipt of the instruction, respective information storage nodes extract an entry in which 2 fields of the original node, the first replica storage node, and the second replica storage node store the node 2 and the node 5 from the data storage table 218, and transmit the entry to adjacent information storage nodes. In step S1804, the administration node 204 waits for termination of the replications of the data for which both node 2 and node 5 are responsible, by all of the information storage nodes.

In step S1805, the administration node 204 instructs information storage nodes whose life-and-death information field in the node management table 248 is "ALIVE" to extract data related to the node 5 of data owned by them, and replicate it to the information storage nodes adjacent to them. The instruction only applies to data which has not been replicated, specifically, data for which the node 2 is not responsible, of data related to the node 5.

In the data storage table 218, respective information storage nodes extract an entry which is related to the node 5 from entries which do not include the node 2 and transmit the entry to adjacent information storage nodes. In step S1806, the administration node 204 waits for termination of the replications of the data related to the node M which has not been replicated, by all of the information storage nodes.

In step S1807, the administration node 204 changes the life-and-death field of the entry for the node 5 in the node management table 248 from "DEAD" to "SUBSTITUTED".

After the step S904 and the step S905 (replication of the node 2's responsible data and updating of the node management table) in the flow chart of FIG. 9, in step S1808, the administration node 204 instructs a node 6 adjacent to the node 5 to collect data for which the node 5 was originally responsible, from the information storage nodes whose life-and-death information field in the node management table 248 is "ALIVE". Specifically, the administration node 204 transmits to the node 6 an instruction for collecting data, together with information identifying the "ALIVE" information storage nodes.

In step S1809, when the node 6 adjacent to the node 5 collects all the data for which the node 5 was originally responsible, the administration node 204 deletes the entry for the node 5 in the node management table 248.

Time taken from step S1801 to step S1804 will be calculated. Similar to the conventional examples of calculation, suppose that the number of information storage nodes is 1000, each information storage node is connected to a network of 1 Gbps, and each information storage node retains 1 TB (terabyte) of original data. (In fact, the data of 1 DB is present in each node's responsible range.)

"Data which should be replicated" instructed to each node in step S1803 is one-thousands of data which is one-thousands of 3TB, i.e., about 3 MB. Time taken to replicate this is about 0.024 seconds. Compared with 2 hours and 13 minutes needed in the conventional examples, it is about one three-hundred-thousandths. In fact, in a very short period of time, it is possible to escape from the situation of "the replication value of 1" in which the risk of data loss is high.

While the embodiments of the present invention have been so far described, the present invention shall not be limited to the embodiments described above. Those skilled in the art can easily change, add, or transform each element of the embodiments within a scope of the present invention.

Although the present invention is preferable to the key value system, it can also be applied to any information storage system other than this. For example, it can apply to a system which manages data by a group consisting of 3 or more data items or a system which manages data by a single data item. Computations to determine an information storage node to which data is stored may be performed by using any function other than the hash function.

Each configuration, function, processing section, processing means, and the like as described above may be implemented by hardware through designing of some or all of them in an integrated circuit, for example. Information on a program, a table, a file, and the like which implement each function can be stored in a storage device such as a memory, a hard disk, an SSD (SolidStateDrive), or a persistent data storage medium such as an IC card, an SC card, a DVD, and the like.

It is possible to replace a part of a configuration of one embodiment with a configuration of another embodiment, as well as to add a configuration of other configuration to a configuration of one embodiment. For a part of a configuration of each embodiment, it is possible to add/delete/replace other configuration.

What is claimed is:

1. An information storage system for storing received data including an original data content and a defined number of replicated data content having the same data content as the original data content, the system comprising:
   a network;
   a plurality of information storage nodes communicatively connected by the network, wherein each of the plurality of information storage nodes is assigned a different range of values; and
   an administration node communicatively connected with the plurality of information storage nodes and configured to:
   select a different one of the plurality of information storage nodes for storing the original data content and replicated data content by:
      substituting some or all information contained in the received data content into a different arithmetic expression for each of the original data content and replicated data content,
      computing each of the different arithmetic expressions to generate a plurality of calculated values, and
      selecting one of the plurality of information storage nodes to store each respective one of the original data content and replicated data content based on each of the generated plurality of calculated values and the range of values assigned to each of the plurality of information storage nodes,
   wherein, on a condition that a first one of the plurality of information storage nodes is interrupted, each of the plurality of information storage nodes is configured to:
      identify whether the information storage node contains data that has an identical content to data stored in the first information storage node, and
      replicate the identified data to another one of the plurality of information storage nodes selected according to a predetermined sequence.

2. The information storage system according to claim 1, wherein, on the condition that the first one of the plurality of information storage nodes is interrupted, one or more of the plurality of information storage nodes in the information storage system and a newly added information storage node collects the data that has the identical content to the data stored in the first information storage node.

3. The information storage system according to claim 1, wherein:
   the administration node includes management information that associates each of the generated plurality of calculated values from each of the different arithmetic expressions with one of the plurality of information storage nodes,
   the each of the plurality of arithmetic expressions includes a hash function, and
   the administration node is configured to refer to the management information when selecting the one of the plurality of information storage nodes to store each respective one of the original data content and the replicated data content based on each of the generated plurality of calculated values and the range of values assigned to each of the plurality of information storage nodes.

4. The information storage system according to claim 1, wherein:
   each of the received original data content and replicated data content includes a data pair consisting of a first data item and a second data item, and
   wherein the some or all of the information contained in the received data content that is substituted into the different arithmetic expression for each of the original data content and replicated data content is the first data item in the data pair.

5. The information storage system according to claim 1, wherein
   the defined number is a value of 3 or higher, and
   on a condition that a second one of the plurality of information storage nodes is interrupted while the identified data is being replicated to the other one of the plurality of identified storage nodes on the condition that the first one of the plurality of information storage nodes is interrupted, each of the plurality of information storage nodes is configured to replicate data, to another one of the plurality of information storage nodes, having identical content to data stored in both the first and second information storage nodes.

6. The information storage system according to claim 1, wherein:
   logical positions associated with the calculated values from the arithmetic expressions are set for the plurality of information storage nodes, and
   the predetermined sequence prescribes that each of the plurality of information storage nodes replicates the data to another information storage node located at a specific position relative to the respective information storage node.

7. The information storage system according to claim 6, wherein:
the administration node is configured to determine a logical position of a newly added information storage node and assign a part of a responsible range of one of the plurality of information storage nodes to the newly added information storage node, and
the newly added information storage node is configured to replicate data from any of the plurality of information storage nodes that store data having an identical content to data in the assigned responsible range.

8. A data replication method in an information storage system for storing received data including an original data content and a defined number of replicated data content having the same data content as the original data content, the method comprising:
selecting a different one of a plurality of information storage nodes for storing the original data content and each of the defined number of replicated data content, wherein each of the plurality of information storage nodes is assigned a different range of values, wherein the selecting comprises:
substituting some or all information contained in the received data content into a different arithmetic expression for each of the original data content and replicated data content,
computing each of the different arithmetic expressions to generate a plurality of calculated values, and
selecting one of the plurality of information storage nodes to store each respective one of the original data content and replicated data content based on each of the generated plurality of calculated values and the range of values assigned to each of the plurality of information storage nodes; and information nodes, respectively;
on a condition that a first one of the plurality of information storage nodes is interrupted:
identifying whether the information storage node contains data that has an identical content to data stored in the first information storage node, and
replicating the identified data to another one of the plurality of information storage nodes selected according to a predetermined sequence.

9. The data replication method according to claim 8 further comprising, on a condition that the first one of the plurality of information storage nodes is interrupted, collecting the data that has the identical content to the data stored in the first information storage node into one or more of the plurality of information storage nodes in the information storage system and a newly added information storage node.

10. The data replication method according to claim 8, wherein:
the defined number is a value of 3 or higher, and
the data replication method further comprises, on a condition that a second one of the plurality of information storage nodes is interrupted while the identified data is being replicated to the other one of the plurality of storage nodes on the condition that the first one of the plurality of information storage nodes is interrupted replicating data, to another one of the plurality of information storage nodes, having identical content to data stored in both the first and second information storage nodes.

11. The data replication method according to claim 8, wherein:
logical positions associated with the calculated values from the arithmetic expressions are set for the plurality of information storage nodes, and
the predetermined sequence prescribes that each of the plurality of information storage nodes replicates the data to another information storage node located at a specific position relative to the respective information storage node.

12. The data replication method according to claim 11 further comprising:
determining a logical position of a newly added information storage node;
assigning a part of a responsible range of one of the plurality of information storage nodes to the newly added information storage node; and
replicating data from any of the plurality of information storage nodes that store data having an identical content to data in the assigned responsible range to the newly added information storage node.

* * * * *